United States Patent

Juengst et al.

Patent Number: 5,805,776
Date of Patent: Sep. 8, 1998

[54] DEVICE FOR AUTOMATIC GENERATION OF A KNOWLEDGE BASE FOR A DIAGNOSTIC EXPERT SYSTEM

[75] Inventors: Ernst-Werner Juengst; Klaus Dieter Meyer-Gramann, both of Berlin, Germany

[73] Assignee: Daimler Benz Aktiengesellschaft, Stuttgart, Germany

[21] Appl. No.: 513,888

[22] PCT Filed: Feb. 14, 1994

[86] PCT No.: PCT/EP94/00420

§ 371 Date: Aug. 17, 1995

§ 102(e) Date: Aug. 17, 1995

[87] PCT Pub. No.: WO94/19739

PCT Pub. Date: Sep. 1, 1994

[30] Foreign Application Priority Data

Feb. 17, 1993 [DE] Germany .......................... 43 05 522.2

[51] Int. Cl.$^6$ ...................................... G06F 15/18
[52] U.S. Cl. ................... 395/75; 395/50; 395/60
[58] Field of Search ................ 395/75, 61, 54, 395/76, 50

[56] References Cited

U.S. PATENT DOCUMENTS

| | | | |
|---|---|---|---|
| 4,766,595 | 8/1988 | Gollomp | 395/183.09 |
| 4,866,635 | 9/1989 | Kahn et al. | 395/51 |
| 4,965,743 | 10/1990 | Malin et al. | 395/50 |
| 5,099,436 | 3/1992 | McCown et al. | 364/550 |
| 5,119,318 | 6/1992 | Paradies et al. | 395/61 |
| 5,121,496 | 6/1992 | Harper | 707/200 |
| 5,212,768 | 5/1993 | Itsuki et al. | 395/54 |
| 5,241,623 | 8/1993 | Shah | 395/76 |
| 5,303,332 | 4/1994 | Kirk et al. | 395/60 |
| 5,386,498 | 1/1995 | Kakefuda | 395/75 |
| 5,598,344 | 1/1997 | Dangelo et al. | 364/489 |
| 5,598,511 | 1/1997 | Petrinjak et al. | 395/54 |

FOREIGN PATENT DOCUMENTS 39 11 465   10/1990   Germany .

Primary Examiner—Tariq R. Hafiz
Assistant Examiner—Sanjin Shah
Attorney, Agent, or Firm—Spencer & Frank

[57] ABSTRACT

Efficient expert systems for failure diagnosis often decisively increase the availability of a technical system by making available to a layman the knowledge of a diagnostic expert. The process attains the following objects: For each variant of a technical system, which is composed of modules, a knowledge base should be efficiently generated. An expert system should be able to quickly diagnose each variant. The process provides the following: In knowledge acquisition, knowledge modules are generated, namely a knowledge module for each type of real module, which occurs in at least one variant of the technical system. The knowledge module contains all diagnosis-relevant knowledge about the real module type in such a way that it is valid for each exemplar of the type. The device according to the invention automatically generates a variant-specific knowledge base by copying each knowledge module from the actual configuration of the variant as many times as there are exemplars of the respective real module type, and then suitably combining the copies. The device inserts the module-copies of the submodules into the module-copy for a composite module.

19 Claims, 16 Drawing Sheets

Malf is effected directly from the outside at One

Malf acts directly from One toward the outside

Malf is an internal malfunction of One

Malf is effected directly from the outside at role in SYS

Malf acts directly from role in SYS toward the outside

The following information is stored in the memory Conf:
The role R in the system SYS is filled by the unit COMP.

Upon insertion, the following is determined:
○ Malf-A corresponds to Malf-A1
○ Malf-B corresponds to Malf-B1
○ Malf-C corresponds to Malf-C1

Evaluation of the explanations for Resu

DEVICE FOR AUTOMATIC GENERATION OF A KNOWLEDGE BASE FOR A DIAGNOSTIC EXPERT SYSTEM

BACKGROUND OF THE INVENTION

Whenever a technical system fails to carry out its standard function, or to do so satisfactorily, a technical diagnosis of this system is required. The technical diagnosis comprises ascertaining the cause of the observed malfunction and then carrying out a remedial measure, which eliminates the cause. For complex technical systems, a diagnosis requires the knowledge of an experienced human expert. Human experts, however, are expensive and often unavailable. That is why a way must be found to make their knowledge available without having to enlist the human experts themselves.

A modern way of attaining this object is to furnish an expert system for technical diagnosis. Efficient expert systems are able to decisively increase the availability of technical systems and to decrease the cost of their use.

Today an expert system is typically constructed as a knowledge-based system, i.e. as a software system in which the knowledge of the human expert is stored structurally in a knowledge base. The remaining components of the expert system are logically separated from the knowledge base and can therefore be reused; all together, they are called the expert system shell. The elements of the expert system shell are the problem solving component, which carries out a diagnosis and for this utilizes the knowledge base, the explanation component, which optionally explains to the user the actions of the expert system; and the user interface. A knowledge-based system is produced by choosing an expert system shell and filling the knowledge base with the structured knowledge of the human expert.

Diagnostic expert systems are classified as symptom-based and model-based systems:

The knowledge base of a symptom-based expert system contains the experiential knowledge of the human expert about the malfunctions of the technical system and about the interrelationships between these malfunctions and the symptoms which can be determined during a diagnosis.

The knowledge base of a model-based expert system contains on the one hand a model, which describes the structure and the functional cooperation of the modules of the technical system to be diagnosed, and on the other hand a description of the standard behavior of all of the modules and of their behavior in the event of a malfunction.

A model-based expert system can only be built if one can build a precise enough model for the structure and the functional cooperation of the modules of the technical system to be diagnosed. In many applications, this is too expensive or totally impossible, since one cannot describe the inner life of the technical system precisely enough. In this case, only the symptom-based approach remains.

The classic and often-used approach for representing the experiential knowledge of an expert in a formalized way is to structure the knowledge in rules in the form of "IF premise, THEN conclusion". The premise of each of these rules is an individual symptom or a logical concatenation of symptoms, which can be observed in the technical system; the conclusion is a statement about which malfunctions can or must exist upon fulfillment of the premise and which have to be ruled out. This structuring is offered for example by "EXSYS" and "NexpertOBJECT", two tools for building expert systems.

A further often-used approach is the error search tree. The knowledge base contains an error tree, that is a directional graph, whose nodes stand for the malfunctions possible in the technical system and whose edges stand for the causal interrelationships among them. The leaves stand for the possible causes. Furthermore, the knowledge base contains interrelationships between malfunctions and symptoms. The expert system "navigates" in this error search tree with the aim of arriving at a leaf. To do so, it analyzes each symptom produced in order to go from one node to another. This kind of process uses the "testbench" expert system shell, for example.

In building symptom-based expert systems, knowledge acquisition has turned out to be a stumbling block; knowledge acquisition is the series of events by means of which the experiential knowledge of a human diagnostic expert is gained by interrogation or in some other way and brought into the structure. in which the expert system can analyze the knowledge. Knowledge acquisition is often expensive, time consuming, and error prone.

The stumbling block and the cost factor of knowledge acquisition are particularly problematic if one desires to provide expert systems for all variants of a class of technical systems and requires only a single expert system, which diagnoses a frequently used technical system. A class of technical systems often has a great many variants: In order to adapt a technical system to the wishes of the client, it is typically made up of modules. Alternative or optional modules are chosen so that their cooperation produces the standard functionality. With a relatively small number of alternatives or options, one already has an immense number of possible variants: With only 10 modules, each having 3 alternatives, there are already $3^{\wedge}$ =59,049 possible combinations.

Until now, no process was known for efficiently building knowledge bases in the case where there are a great many variants. It is very inefficient to build an individual knowledge base "by hand" for each variant or to adapt a knowledge base "by hand" to a variant. Furthermore, there is often not enough experiential knowledge for a certain variant.

If one desires to build a single knowledge base which is valid for each variant and can therefore be used universally, then one must refer explicitly to the different variants in the structured knowledge. The behavior and hence the knowledge about a module of the technical system often depends upon which version another module is. When knowledge is acquired, one must take into account all possible versions— their behaviors can differ considerably, especially when there is a malfunction. Case differentiations are required for the different variants of the technical system and due to the immense number of combination possibilities, one must distinguish among many cases. The structured knowledge is extremely extensive. It can hardly be seen in an overall view, can be maintained and validated only with difficulty, and requires a lot of storage space.

An expert system must often be able to diagnose several or even all variants of the technical system—for example if the expert system is used in an automotive repair shop and many different vehicle models must be serviced. The previously known kinds of process have considerable disadvantages:

The disadvantages of a universally usable knowledge base have already been mentioned.

If a technical system needs to be diagnosed, before the actual diagnosis, the knowledge base is assembled from components "by hand" and tailored to the respective variant. The person who carries out this task must personally see to it that the components are suited to one another. This task is time consuming, costly, and can only be carried out by specialists since it requires a good knowledge of the structure of the knowledge base.

To begin with, an individual knowledge base is made available to the expert system for each variant. If a technical system needs to be diagnosed, the expert system chooses the suitable knowledge base and uses it.

The expert system can only diagnose the variants for which it has a knowledge base; one must therefore know in advance which variants will possibly need to be diagnosed. The expert system cannot diagnose other variants at all. When each new variant comes into use, a new knowledge base must be furnished. The quantity of knowledge bases requires a large amount of storage space.

A technical system changes often in the course of its use: A module is replaced by another, which differs from the first with regard to diagnosis. Up until now, no method was known for efficiently updating the knowledge base of an expert system for this technical system. The processes known previously required one to search through the entire knowledge base for entries of the "old" module and to revise "by hand" the knowledge dependent upon the "old" module.

SUMMARY OF THE INVENTION

The object of the invention, therefore, was to create a device which permits time- and money-saving knowledge acquisition, which is also less error prone, for a class of modular technical systems, even if the class has a great number of variants, and with which, when making diagnosis-relevant changes to one variant, one can rapidly and with few errors adapt the knowledge base to the changes.

Building on this device, a method had to be developed so that an expert system can quickly diagnose each possible variant of the technical system.

Security analyses and the FMEA ("failure mode and effect analysis") are two examples of stated objects in which an error model ("error tree") of a technical system TS is needed. In the case where there are a great many variants, the aforementioned problems of building a knowledge base also arise in this task as well. An additional object of the invention, therefore, was to create a device which permits a complete error model to be generated, even for a class of modular technical systems having a great many variants.

The concept of the device according to the invention is: The knowledge of the expert needed for a diagnosis is divided up in the formalized storage, actually analogous to the modularization of the technical system. The knowledge about an M-type module, which occurs at least once in a variant of the technical system, is structured so that it is valid for all exemplars of the M-type. All knowledge about M-type required for a diagnosis is combined after the knowledge acquisition and stored in a logical module. This logical module is referred to below as a "knowledge module". The knowledge base for a variant is built automatically by means of configuration of knowledge modules from the actual configuration of the variant. FIG. 1 illustrates this concept.

DETAILED DESCRIPTION OF THE INVENTION

The essential information for the device according to the invention is held in two memories:

The memory Conf contains the actual configuration of the variant to be diagnosed, i.e. the information as to which modules the particular variant in question comprises and of which module type each module is.

The memory KM contains all the required knowledge modules. For each module type, which occurs in at least one variant of the technical system, the accompanying knowledge module is contained in the memory KM. In addition, KM contains a knowledge module for the technical system as a whole, which describes how the other knowledge modules are to be combined.

The knowledge modules in KM are built in the course of knowledge acquisition. A knowledge module in KM is employed for generating a knowledge base whenever the real module type occurs at least once in the variant for which a knowledge base is to be generated. The information in Conf is specifically for the variant to be diagnosed, while the knowledge modules can be reused for each different variant of the technical system.

The knowledge base for a variant is built by means of configuration of knowledge modules: A computer Kb-builder for generating a knowledge base, by reading access to Conf, ascertains the actual configuration of the variant and then for each real module in the variant generates a copy of the knowledge module for the type to which the real module belongs. If a real module occurs n times in the variant, n copies of the knowledge module are generated. Kb-builder automatically combines all of the copies of the knowledge module generated thus and stores them in a memory Kb.

Before it is described how the knowledge modules are structured and how they are automatically combined, the result of the combining procedure will be described; that is, it will be explained which structure an automatically generated knowledge base has. The information in the knowledge base is organized as a semantic network. The nodes of this network stand for terms which are meaningful for the diagnosis of the technical system; the edges stand for the interrelationships between these terms. These terms and interrelationships are explained below.

Figure 3:
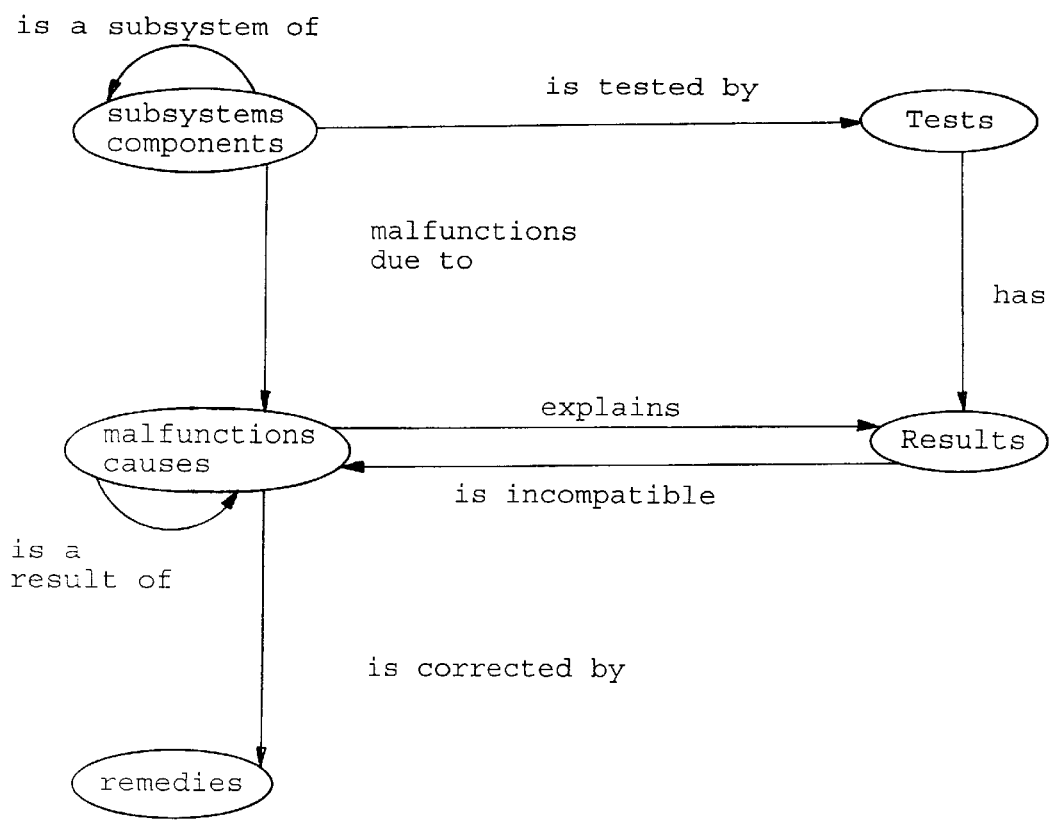
FIG. 3 illustrates the terms and interrelationships of the semantic network, which according to the process of the invention, structures the automatically configured knowledge bank.

The technical system consists of modules, modules have submodules, etc. The smallest exchangeable units for the respective diagnostic task are understood to be elementary modules and are called "components" below. The term "subsystem" will be used for all composite modules. The term "systems" will be employed for the subsystem and the technical system as a set. The term "units" will be used for systems and components. FIG. 3 shows the correlation among these terms.

Malfunctions occur in units. The term "malfunction" indicates every kind of erroneous behavior or condition of the unit caused by error.

Malfunctions are causally interconnected with one another. A causal interconnection takes the form "malfunction A is a result of malfunction B". The causal relationships among malfunctions form the malfunction graph for the technical system.

A malfunction which is not a result of another malfunction, and is therefore a leaf of the malfunction graph, is referred to as a single cause. The goal of a diagnosis is to identify the single cause actually present in the technical system—or the actual multiple cause, which consists of several single causes occurring at the same time.

A remedial action is assigned to each single cause, that is, a measure taken or a result of measures taken which remove the single cause.

In order to find out in the course of a diagnosis which cause exists in the technical system, tests are carried out, whether automatically, actually by the expert system, or by a person.

The possible outcomes of a test are called results. The standard result of a test is the result which the test has when the technical system is malfunction-free.

In order to be able to evaluate a result produced during a diagnosis, it is logically connected to malfunctions. Two kinds of relationships between a malfunction and a result are distinguished:

A malfunction "explains" a result if the malfunction can be shown to be responsible for the result.

A malfunction "is incompatible with" a result.

These two relationships rule each other out; often neither of the two relationships exists between a malfunction and a result.

Figure 1:
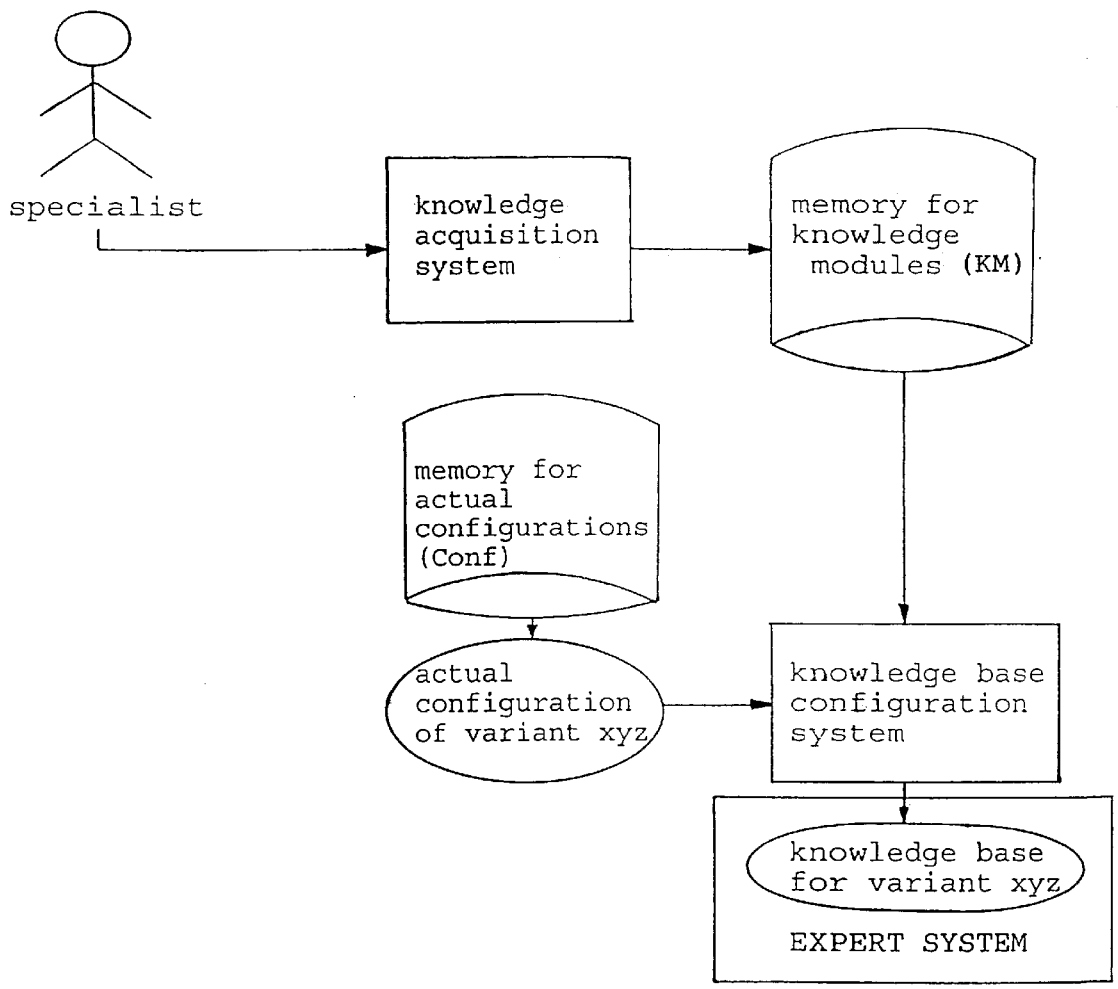
FIG. 1 illustrates the concept of configuring a knowledge base automatically out of knowledge modules.
Figure 2:
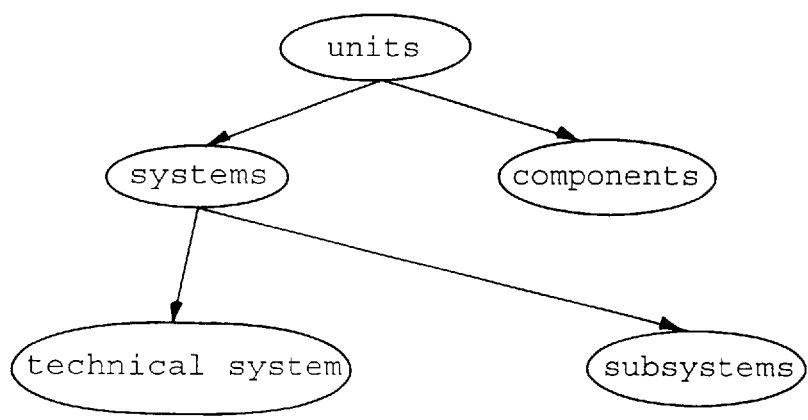
FIG. 2 shows the interrelationships among the terms "units", "systems", "components", "subsystems", and "technical system".

FIG. 2 illustrates the terms and interrelationships of the semantic network, which structures the automatically configured knowledge base according to the process of the invention.

So that an efficient knowledge acquisition is possible and so that a knowledge base can be automatically configured, according to the invention, on the basis of knowledge modules, the organization of the information contained in the knowledge modules must satisfy the following requirements:

The information about a unit type must be structured in the knowledge module so that it does not depend upon how a unit of this type is employed.

The copies of the knowledge module which the computer Kb-builder generates must be automatically combined on the basis of the information in the memories KM and Conf.

For the technical system as a whole, there must be a knowledge module that defines how the knowledge modules for the subsystems are to be combined. Functionally, this knowledge module has the same structure as one for a subsystem type.

The knowledge module for a system type may not depend upon which type the subunits of an exemplar of the system type are, since otherwise the problem of the great number of variants makes the building of the knowledge modules inefficient. The knowledge module must describe the results, though, which a malfunction in a subunit has.

The knowledge about a subsystem must be configurable using knowledge modules in precisely the same manner as the knowledge base for the technical system itself.

In order to fulfill these requirements, there is a knowledge module for the technical system as a whole and a knowledge module for each subsystem and each component type, which occurs at least once in the technical system. In a word: There is one knowledge module per unit type. Each knowledge module is stored in a data structure "knowledge module" in the memory KM.

When knowledge is acquired, all knowledge modules are generated and stored. The knowledge module for a U-type unit combines all the diagnosis-relevant knowledge about U-type. The following are stored:

a malfunction graph-module for U-type, which consists of all the malfunctions that can occur in U-type and the causal interrelationships between them, all remedies in U-type that remove malfunctions in U-type, all tests that pertain to U-type, the standard result and the non-standard results for each test.

"A malfunction is stored" means that a unique identification for the malfunction is recorded in the memory.

The knowledge module for a unit type contains a malfunction graph-module for the unit type. The entire malfunction graph for the technical unit is generated by means of an automatic combining of copies of these malfunction graph-modules. So that this is possible, several malfunctions are characterized as logical external interfaces in the malfunction graph-module for the unit type. The malfunctions which indicate logical external interfaces are distinguished according to their direction of action for the unit type. There are therefore by and large the following three kinds of relationship between a malfunction Malf and a unit type One:

Malf acts directly from One toward the outside (and is therefore a logical external interface)

Malf is effected upon directly from the outside at One (and is therefore a logical external interface)

Malf internally impairs One (and is therefore not a logical external interface)

Figure 4:
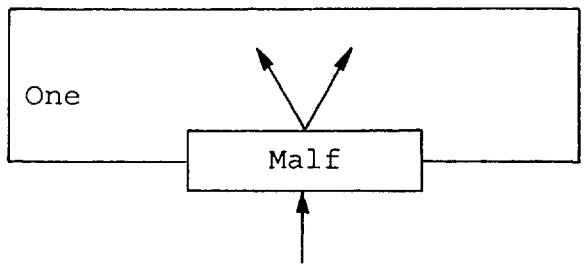
FIG. 4 illustrates the three possible kinds of relationship between a unit-type and a malfunction.
Figure 4:
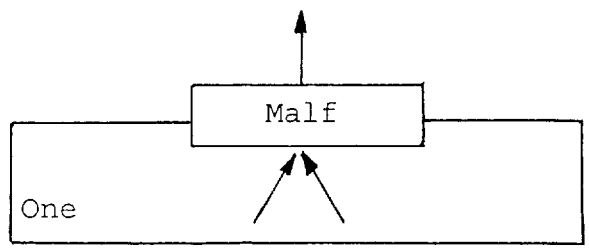
Figure 4:
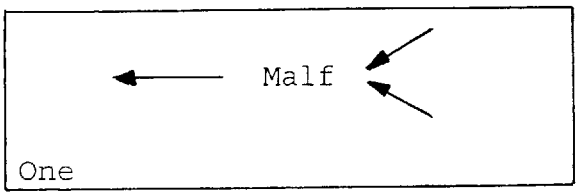

FIG. 4 illustrates these three kinds of relationship.

The malfunction graph-module for a component type contains only malfunctions in the component type itself, none in other unit types. The malfunction graph-module for a system type shows which malfunctions are caused by a malfunction in a subunit of the system type. But it may not explicitly name a version of the subunit. Only by means of this limitation can the above explained requirements be fulfilled.

This is made possible by introducing the term "role in the system type". Each subunit of the system type fills an appointed role for the functioning of the system. Just as actors fill the roles in a play, it is said that the subunits of a system fill the roles in the system.

In the knowledge module, the description of the manner in which a subunit can malfunction is fixed to the role that the subunit performs. A malfunction Malf, according to the direction in which it acts, can be connected in two ways to a role Ro in an S-type system:

Malf acts directly from Ro toward the outside (and is therefore a logical external interface)

Malf is effected directly from the outside at Ro (and is therefore a logical external interface)

Figure 5:
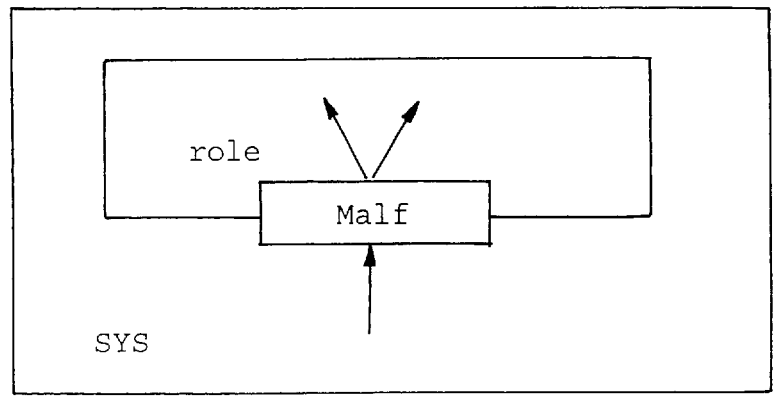
FIG. 5 illustrates the two possible kinds of relationship between a role in a system-type and a malfunction.
Figure 5:
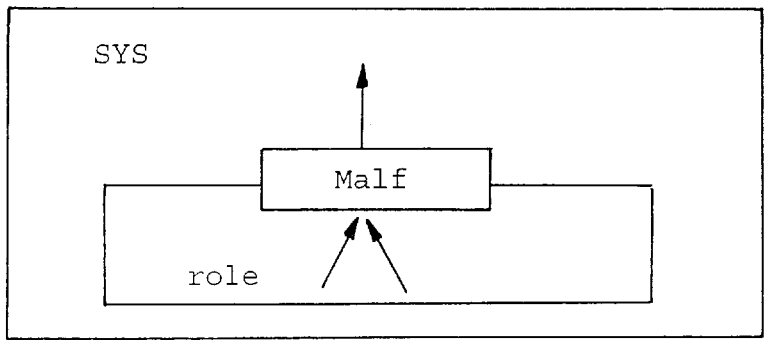

FIG. 5 illustrates these interrelationships.

The interrelationship between malfunctions in different roles in S-type is described in the knowledge module for S-type, but the interrelationship between different malfunctions in one role in S-type is not described in the knowledge module for S-type, but rather in the knowledge module for filling the role Ro in S-type.

The concept of "roles in a system type" is a key which is utilized by a great number of variants of a modular system: Typically, many variants of the system type can be distinguished only by the different casting of the roles, but not by how the roles interact. Since the malfunction graph-module only refers to roles, but not to subunits, it is valid for each version of the system type that has this role.

Malfunctions in an S-type system type can be connected to other malfunctions in S-type or to malfunctions in roles in S-type. There are the following possibilities:

The result of a malfunction which is effected directly from the outside at S-type is either a malfunction which internally impairs S-type, or one which is effected directly from the outside on a role in S-type, or one which acts directly from S-type toward the outside.

The result of a malfunction which internally impairs S-type is either another malfunction which internally impairs S-type, or one which is effected directly from the outside on a role in S-type, or one which acts directly from S-type toward the outside.

What result a malfunction has, which acts directly from S-type toward the outside, is not stored in the malfunction graph-module of S-type, but in a malfunction graph-module of a system type in which a system of the S-type is cast to play a role.

The result of a malfunction, which acts directly from a role in S-type toward the outside, is either a malfunction which internally impairs S-type, or one which is effected directly from the outside on another role in S-type, or one which acts directly from S-type toward the outside.

What result a malfunction has, which is effected directly from the outside on a role in S-type, is not stored in the malfunction graph-module of S-type, but rather in a malfunction graph-module of a unit type, to which the casting of the role belongs.

So that the entire malfunction graph for the technical system can be built, it must be guaranteed that the logical external interface of the malfunction graph-module for a role is suited to the logical external interface of the malfunction graph-module for casting of the role. That is why a definition must be found when a malfunction in a role in a system type and a malfunction in the casting of the role correspond to one another. One definition is shown as the advantageous embodiment of the claim. A definition must guarantee that for one malfunction in a role, there is at most one corresponding malfunction in the casting of the role. It is permissible for there to be no correspondence at all in a role assignment, i.e. casting, and this means that the malfunction described by means of the malfunction in the role cannot occur in the casting.

The knowledge module for a unit type One contains all logical interrelationships between malfunctions and test results in One. Each malfunction, for which what is stored in the knowledge module for One is that it explains a non-standard test result in One, is itself a malfunction in One and hence is stored in the knowledge module for One. Each malfunction, for which what is stored in the knowledge module for One is that it is incompatible with a test result in One, is itself a malfunction in One.

The computer Kb-builder automatically generates a variant-specific knowledge base. It has reading access to a memory Conf, in which the actual configuration of the variant of the technical system is described for which a knowledge base should be generated. The next step describes which information is stored in Conf.

Conf contains a unique identification for each unit concerning the technical system. Which unit type the unit belongs to is stored for each identification. Therefore, if n exemplars of a U-type unit occur in the technical system, then Conf contains n identifications for these exemplars, which each carry a reference to U-type. Furthermore, which unit fills each role for a system SYS is stored in Conf; SYS can be a subsystem or the technical system as a whole. Therefore for each role Ro in SYS, the interrelationship between SYS, Ro, and the unit One, which fills Ro in SYS, is stored in Conf—for example as a triple (SYS, Ro, One).

Figure 6:
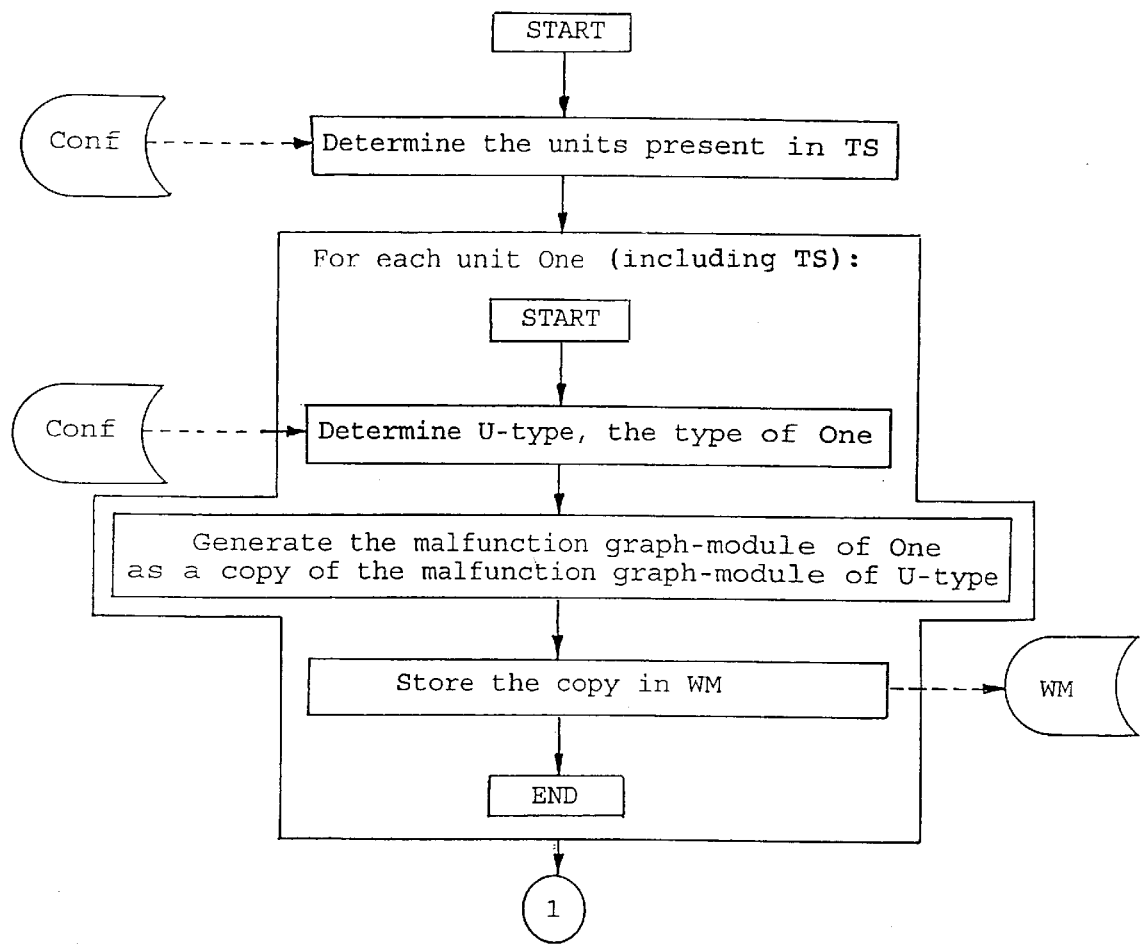
FIG. 6 shows how a computer Kb-builder automatically generates a complete malfunction graph for a technical system. The actual configuration of the technical system is stored in the memory Conf; KM contains all necessary knowledge modules.
Figure 6A:
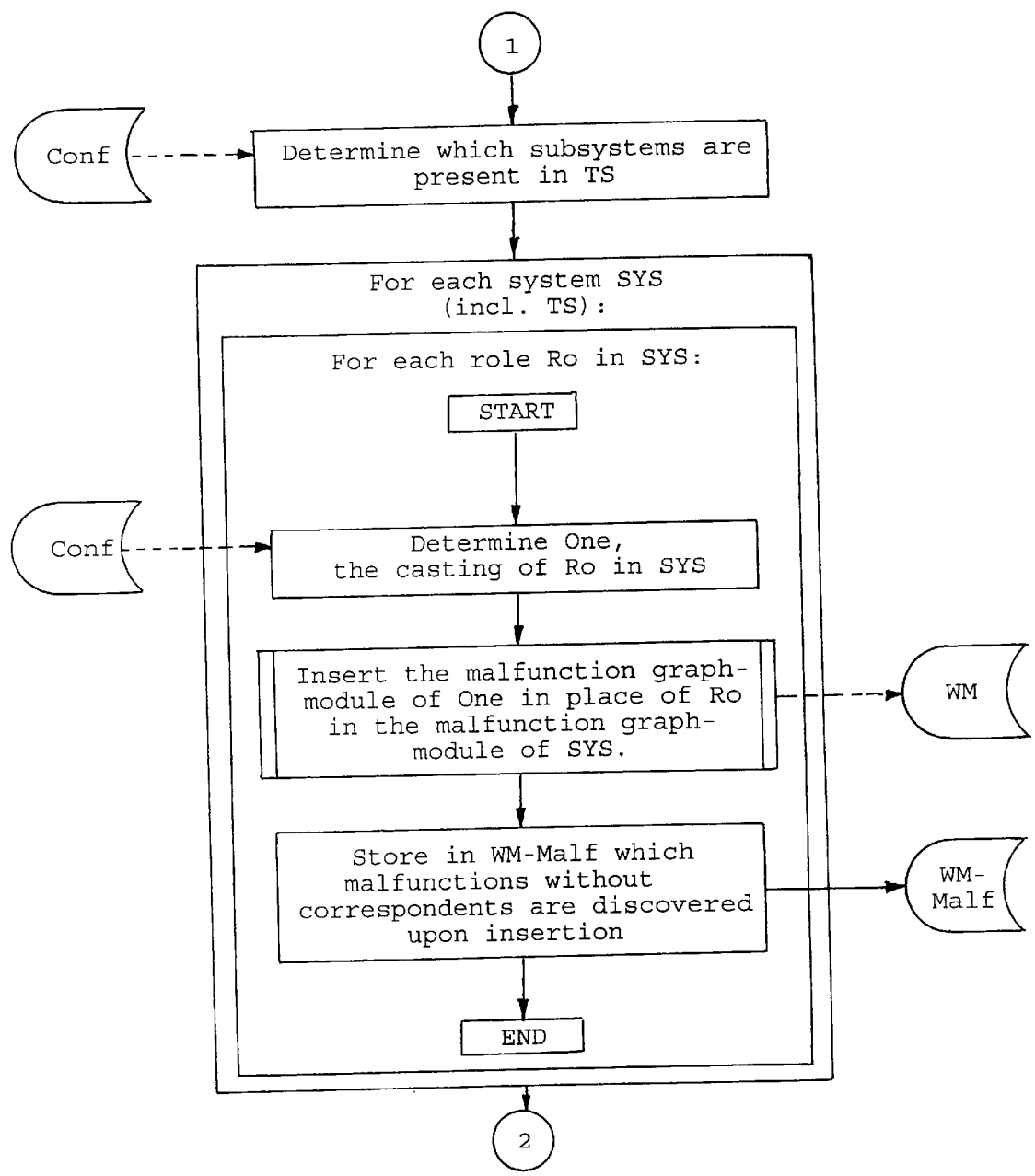
Figure 6B:
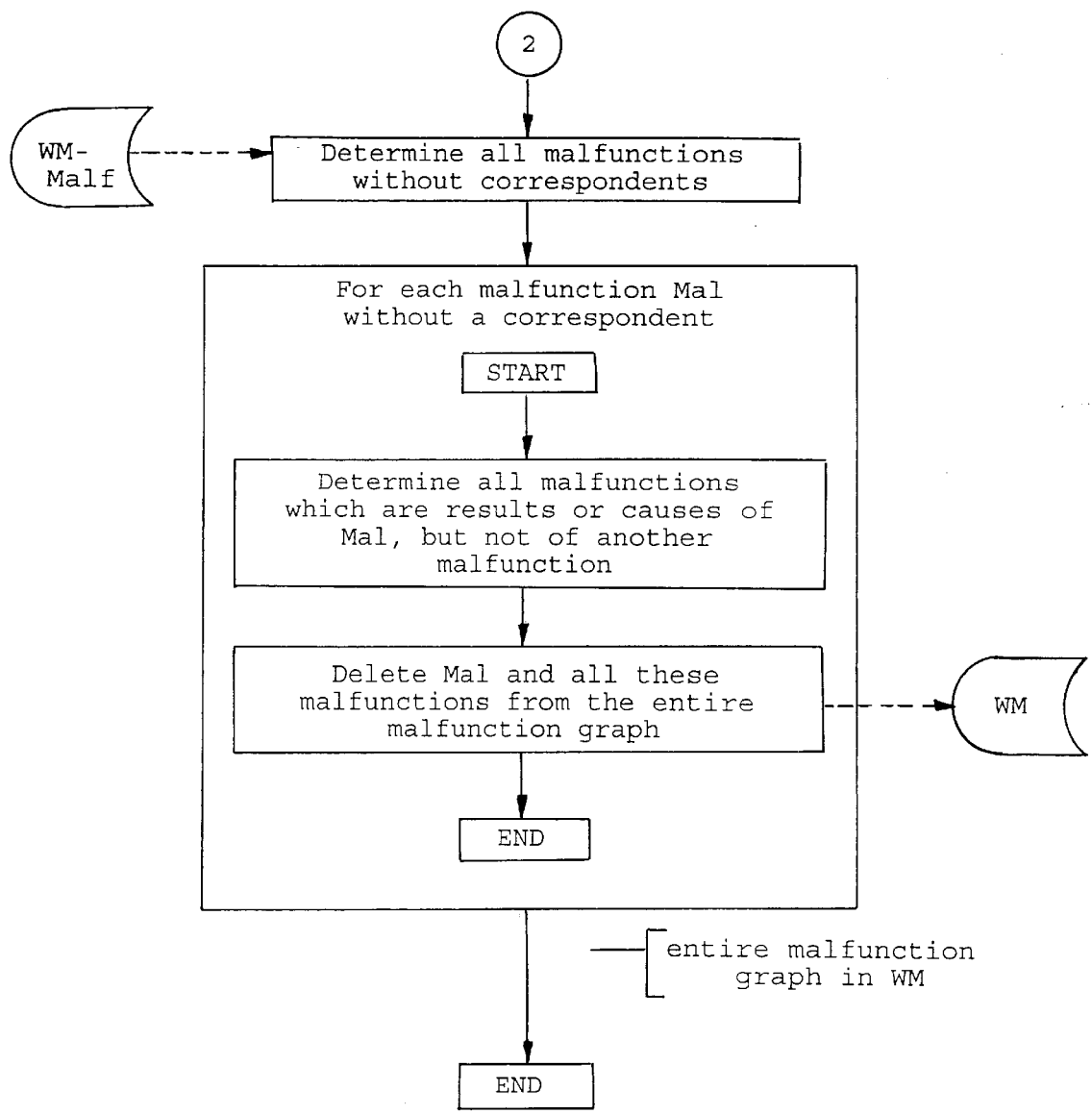

The process according to which the computer Kb-builder generates the knowledge base for a variant TS of the technical system is described below and in FIG. 6. Kb-builder has reading access to the memory KM for the knowledge modules as well as to the memory Conf for the actual configuration of the variant. Kb-builder has writing access to the memory Kb and read/write access to two working memories WM and WM-Malf.

After reading access to KM, Kb-builder generates a copy of the malfunction graph-module for the technical system as a whole. Kb-builder takes from the memory Conf the information as to which units exist in the technical system. For each existing unit One, Kb-builder determines the type to which the unit belongs and makes a copy of the malfunction graph-module for the U-type unit of One. For short, the copy is called malfunction graph-module for One. More precisely formulated, this "copy" means:

For each malfunction in U-type stored in the knowledge module, Kb-builder generates a copy and provides the copy with a reference to One.

For each causal interrelationship between two malfunctions which is stored in the knowledge module, an interrelationship of the same kind is generated between the respective copies. Therefore, if what is stored in the knowledge module for One is that Malf-A is a result of Malf-B, wherein Malf-A and Malf-B are malfunctions in U-type, then the fact that the copy of Malf-A with reference to One is a result of the copy of Malf-B with reference to One is recorded in the malfunction graph-module for One.

If there are n exemplars of a unit type in the variant of the technical system, then n copies are made of the malfunction graph-module for the unit type.

All copies of malfunction graph-modules are stored in WM.

If this job is accomplished, then Kb-builder creates the overall malfunction graph for the variant:

(A) Kb-builder takes from the memory Conf the information as to which subsystems exist in the technical system.

(B) For each SYS, wherein SYS is itself TS or is a subsystem in TS, by means of reading access to Conf, Kb-builder determines which roles there are in SYS and determines for each role, which unit fills the role in SYS.

Kb-builder inserts the malfunction graph-module for One into the malfunction graph-module for SYS in place of Ro.

Figure 7:
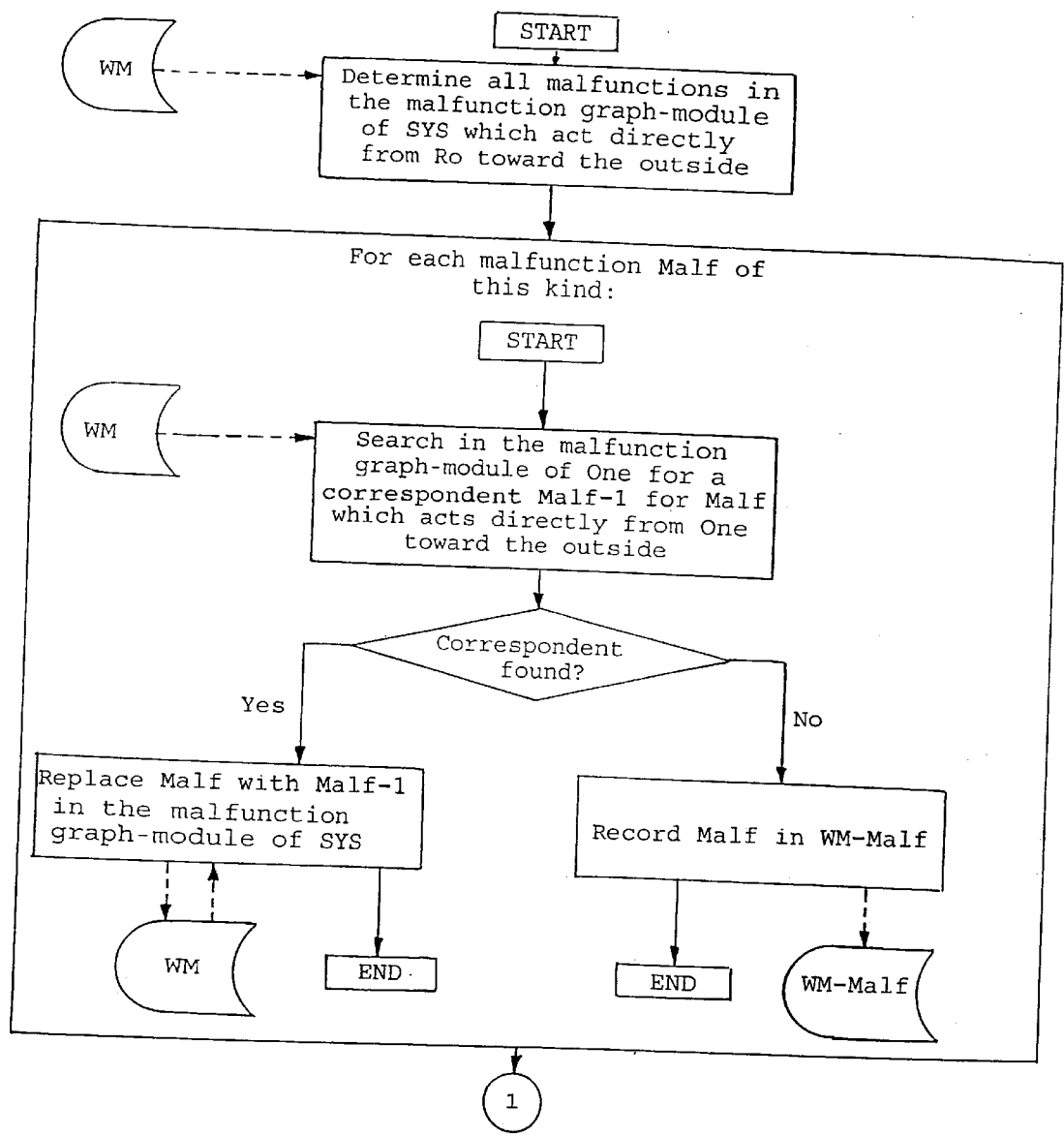
FIG. 7 shows how, during the generation of the complete malfunction graph, the malfunction graph-module for a unit is inserted in place of Ro in the malfunction graph-module of SYS.
Figure 8:
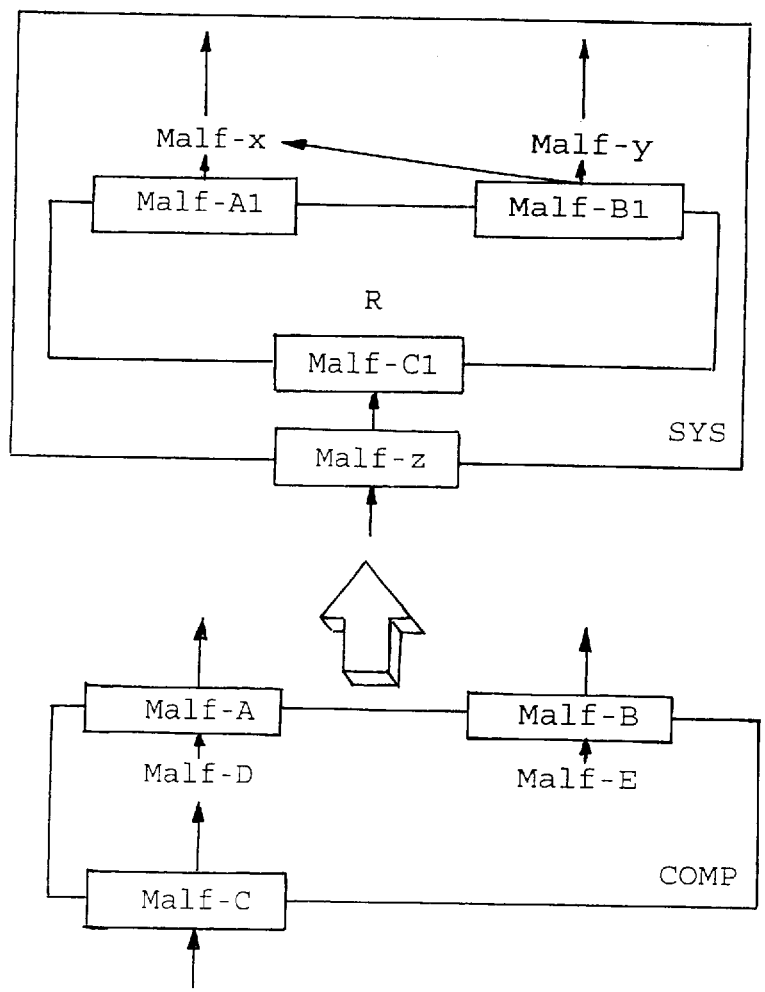
FIG. 8 illustrates the insertion shown in FIG. 7.

An insertion of this kind is shown in FIG. 7 and illustrated in FIG. 8; it consists of the following steps:

(1) For each malfunction Malf in the malfunction graph-module for SYS, which malfunction acts directly from Ro toward the outside, a malfunction Malf-1 is searched for in the malfunction graph-module for One, which malfunction acts directly from One toward the outside and which is a correspondent of Malf. According to how "corresponding" is defined, there is at most one correspondent.

If Kb-builder finds a correspondent, Malf is replaced by Malf-1 in the malfunction graph-module for SYS. Malf-1 is causally interrelated with at least all malfunctions with which Malf was causally interrelated.

If Kb-builder finds no correspondent, Malf is recorded in the working memory WM-Malf.

(2) For each malfunction Malf in the malfunction graph-module for SYS that is effected directly from the outside on Ro, a malfunction Malf-1 is searched for in the malfunction graph-module for One, which malfunction is effected directly from the outside on One and which is the one correspondent of Malf. According to how "corresponding" is defined, there is at most one correspondent.

If Kb-builder finds a correspondent, Malf is replaced by Malf-1 in the malfunction graph-module for SYS. Malf-1 is causally interrelated with at least all malfunctions, with which Malf was causally interrelated.

If Kb-builder finds no correspondent, Malf is entered in the working memory WM-Malf.

After the conclusion of all insertion steps, the malfunction graph-modules, which were previously stored in WM, are linked to a single malfunction graph. At this point Kb-builder removes from this malfunction graph each malfunction which is also stored in WM-Malf. A malfunction is then stored in WM-Malf if it is associated with a role and Kb-builder has found no corresponding malfunction in the casting of the role. Kb-builder enters all malfunctions from Kb-Malf and deletes from the malfunction graph each entered malfunction itself as well as iteratively deleting all malfunctions, which are direct or indirect results of Malf, but of no other malfunction, as well as all malfunctions which are direct or indirect causes of Malf, but of no other malfunction.

After this work, the malfunction graph for the variant is produced in final form; Kb-builder stores it in the memory Kb.

Kb-builder determines once more by reading access to the memory Conf which units exist in the technical system for which a knowledge base should be built. For each unit One, where One is the technical system as a whole or a unit in the technical system, Kb-Conf determines to which type U-type One belongs and copies the knowledge module for U-type, except for the malfunction graph-module already copied previously. More precisely formulated, this "copy" means:

For each remedy, test, and result stored in the knowledge module, Kb-builder generates a copy and provides the copy with a reference to One.

For each interrelationship between a single cause and a remedy, between a test and a result, and between a malfunction and a result, which interrelationship is stored in the knowledge module for U-type, an interrelationship of the same kind is generated between the respective copies.

All copies of the knowledge module generated in such a way are stored by Kb-builder in Kb. Hence the knowledge base is configured ready-made.

The device according to the invention attains the object set at the beginning of the description of efficiently building knowledge bases for each variant of a class of technical system. One must build a knowledge module once for each unit type. According to the invention, one must describe the actual configuration for each variant for which a knowledge base should be built. A knowledge base configuration system, which has reading access to all knowledge modules and all actual configurations, then automatically generates all the needed knowledge bases.

If a unit is replaced in a variant by a unit of another type, the new configuration of the variant is described according to the invention. Then the knowledge base automatically generates a completely new knowledge base for the variant.

The device according to the invention is suited for automatically generating an error model, namely an overall malfunction graph for TS from malfunction graph-modules and the actual configuration of TS. In order to attain this object, a knowledge module need only contain the malfunction graph-module for the respective unit type. For the moment, the process works like the one with which a knowledge base is built for an expert system. It, however, has already achieved its goal and breaks off once the entire malfunction graph for TS is fully generated.

Advantageous Embodiment

The device according to the invention furnishes a malfunction graph and all further information so that an expert system can employ the error search tree.

This course, which in principle could be taken, has a serious disadvantage, though: If an expert system is to get to a leaf from the node which it has actually reached, it must change from the node to one of its successors. Because of the results produced, it is often not possible to uniquely identify one of the successors. Then the expert system must "generate a hypothesis", that is, continue the error search on a trial basis in one of the successors. If it turns out later that the hypothesis is false, the expert system must return to the node, that is it must carry out a so called "backtracking", which can be time-consuming and can lead to inconsistencies.

The following reasons can be responsible for the fact that the expert system cannot uniquely identify a successor of the node reached:

There is no test whose results make it possible to distinguish between the successors.

Since a multiple cause exists, several successors are identified.

Figure 9:
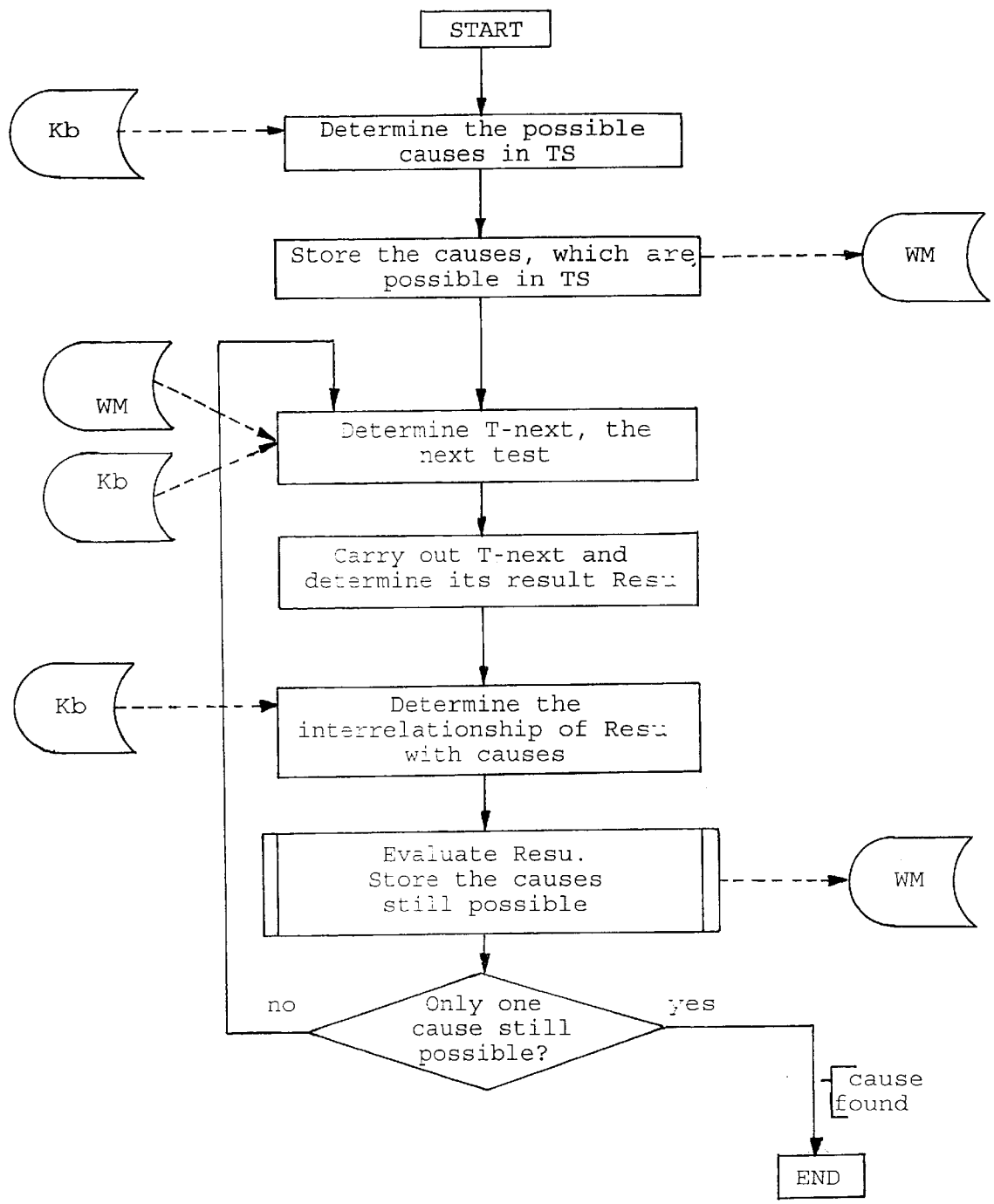
FIG. 9 shows how a computer Diag diagnoses a technical system by working through a knowledge base generated according to the invention.

That is why in the invention a different course is taken. The expert system does not "navigate" in the malfunction graph with the aim of reaching a leaf. Rather, the expert system diagnoses the technical system according to a process which FIG. 9 illustrates and which is able to find not only a single cause but also a multiple cause by means of a single diagnosis.

During the diagnosis, the expert system has read/write access to a working memory WM-expl, in which are stored all causes which are still possible. A cause is "still possible" if it explains each non-standard result produced in the course of the diagnosis up until now and is incompatible with none of them. A multiple cause explains a result if at least one of the single causes of which the multiple cause is comprised explains the result. It is incompatible with a result if at least one of its single causes is incompatible with the result. A multiple cause is taken into consideration if, while it is still possible, nevertheless none of its single causes is still possible per se.

The expert system records each cause which is incompatible with a produced result in a second working memory WM-incomp.

The expert system proceeds with the diagnosis as follows:

At the start of the diagnosis, all causes are still possible. That is why the expert system records each leaf of the malfunction graph in the working memory WM.

The expert system repeats the following sequence of steps until only one single cause is contained in the memory WM-expl:

(1) The expert system determines which test is carried out next.

(2) The expert system itself or a person carries out this test and determines which of the possible results the test actually has.

(3) The expert system evaluates the result produced in step (2) and changes the contents of WM-expl. How this happens is described in the next step.

(4) The expert system tests how many causes are now in WM-expl.

As soon as only one single cause is contained in WM, this cause is identified as actually present. The remedy associated with each of its single causes is either automatically carried out by the expert system or it is suggested that a person carry it out.

Figure 10:
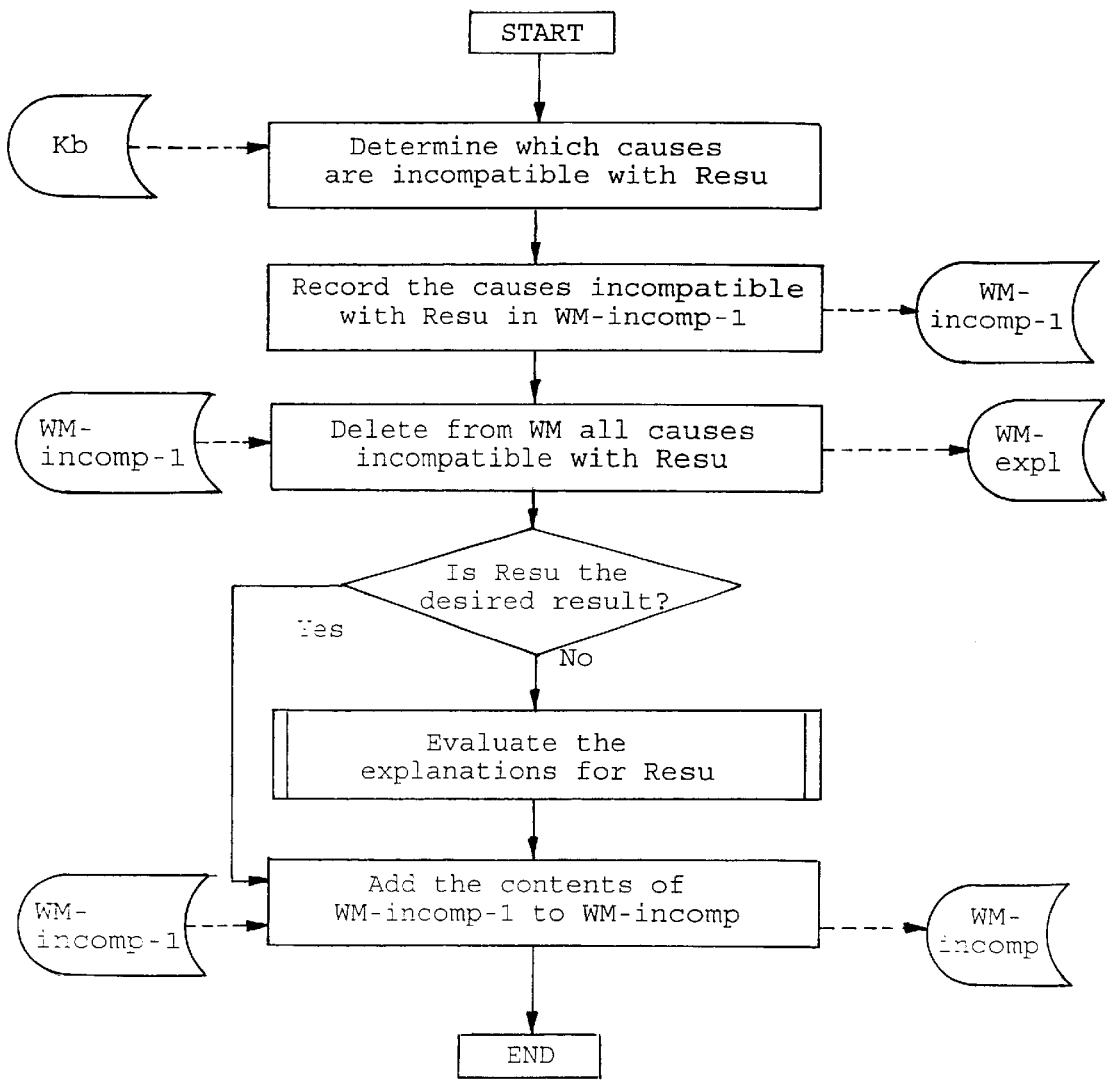
FIG. 10 shows how a result Resu is evaluated during a diagnosis.
Figure 11:
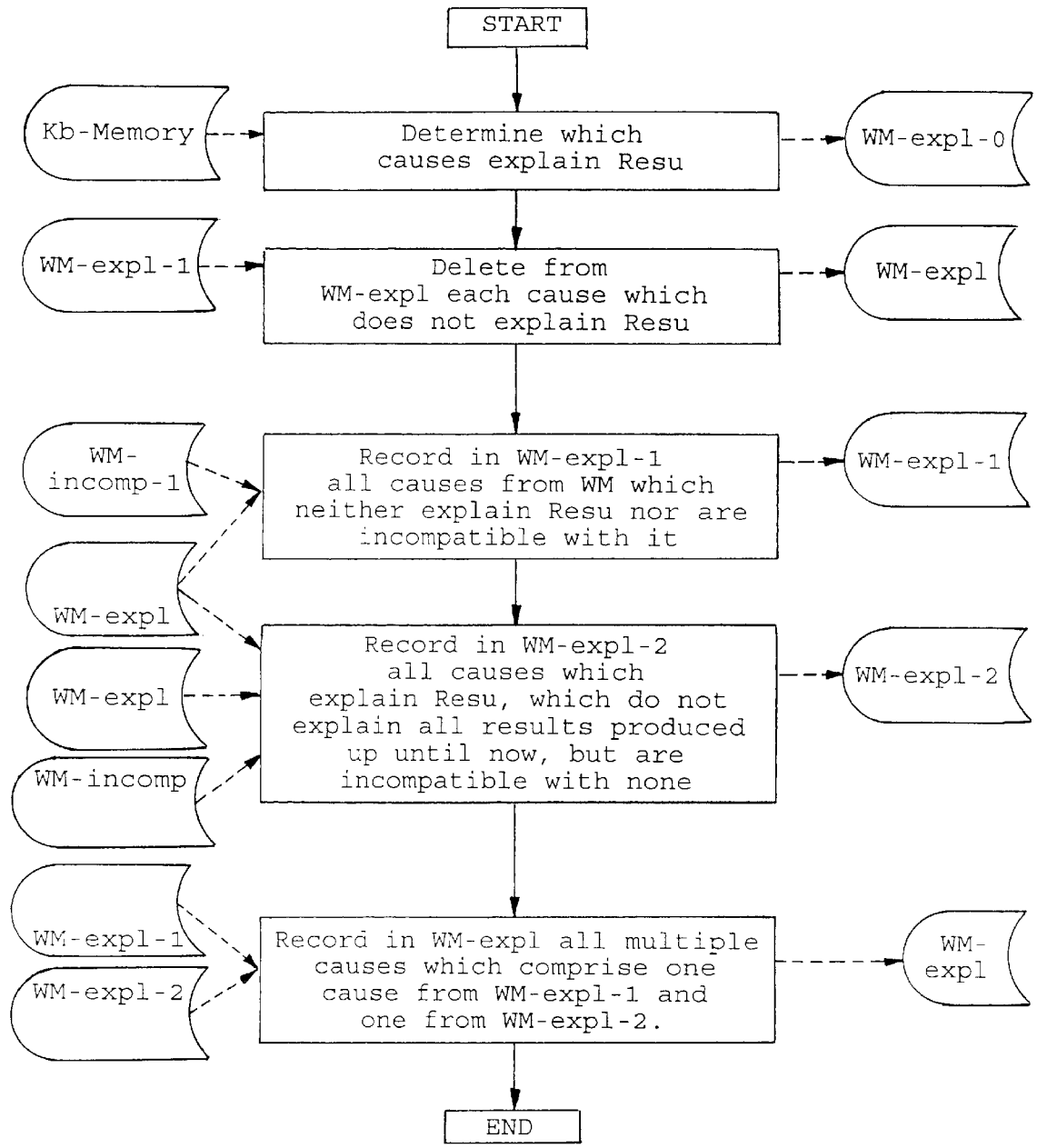
FIG. 11 shows how, during the evaluation of a result Resu, the explanations for Resu are evaluated.

FIGS. 10 and 11 illustrate the work steps by means of which a result Resu is evaluated and the evaluation outcome is written in the working memory WM-expl:

The result Resu is evaluated as follows:

The expert system determines which causes are incompatible with Resu.

The expert system deletes from WM-expl all causes which are incompatible with Resu.

The expert system determines whether Resu is the standard result or a non-standard result of the test which provided Resu.

If it is a non-standard result, the expert system does the following:

It determines which causes explain Resu.

It deletes from WM-expl all causes which do not explain Resu.

It adds to WM-expl each possible multiple cause which consists of a cause from WM-expl which does not explain Resu, but also is not incompatible with Resu and a cause which explains Resu and is contained neither in WM-expl nor in WM-incomp, i.e. that does not actually explain all the results produced up till this point, but is not incompatible with any of them.

The expert system adds to WM-incomp all the causes which are incompatible with Resu.

So that the expert system can evaluate a result Resu, the information must be available as to which causes explain Resu and which interrelationships are incompatible with it. The expert system produces this information by combining the entire malfunction graph for the technical system with the interrelationships between Resu and malfunctions, which interrelationships are stored in the knowledge base. It employs these principles:

(1) If a malfunction Malf explains a result Resu, then every cause of Malf also explains Resu.

(2) If a malfunction Malf is incompatible with a result Resu, then Malf-1 is a cause of Malf.

Principle (1) is used as follows to determine which causes explain Resu:

(A) It is determined which malfunctions are stored in the knowledge base as explanations of Resu.

(B) For each explanation Malf-E which is itself not a cause, the causes are determined which bring Malf-E about: That is, all the leaves of the branch of the malfunction graph whose root is Malf-E.

(C) Each cause which is either stored directly in the knowledge base as an explanation of Resu, or is found at least once in step (B), explains Resu.

Principle (2) is used as follows to determine which causes are incompatible with Resu.

(A) It is determined for which malfunctions what is stored in the knowledge base is that they are incompatible with Resu.

(B) For each malfunction Malf-E which is incompatible with Resu, which malfunction is itself not a cause, the causes are determined which bring Malf-E about: that is, all the leaves of the branch of the malfunction graph whose root is Malf-E.

(C) A cause Cau which was determined as incompatible in (C) above is then incompatible with Resu if each result of Cau is either itself incompatible with Resu or is the cause of a malfunction which is incompatible with Resu.

(D) In addition, any cause that is directly stored in the knowledge base as incompatible with Resu is incompatible with Resu.

An advantageous embodiment of the invention is that in which in a first phase, a computer Ex extracts from the automatically generated knowledge base for the technical system TS to be diagnosed just the information which is required for the diagnostic strategy according to the invention and stores it in a memory Kb-ex. After the work of Ex, the following is stored in Kb-ex:

which single causes can occur in TS and its modules, for each of these causes, which remedy eliminates the cause, which tests can be carried out in TS and its modules in the course of a diagnosis, for each of these tests, which standard result and which non-standard results the test has, for each result, those causes with which it is incompatible, and additionally, for each non-standard result, which causes explain it.

In a second phase, the expert system works according to the diagnostic strategy of the invention and has reading access to the memory Kb-ex. The expert system does not need the "actual" knowledge base produced by the computer Kb-builder and stored in the memory Kb. This process is advantageous because the extraction need only occur once and the result of the extraction can be reused for each diagnosis of TS, as long as no diagnosis-relevant changes are carried out in TS. In addition, the extraction result requires less storage space than the original knowledge base.

How should the expert system determine during a diagnosis which test should be carried out next? One possibility is to ask the user. This, however, might possibly overtax inexperienced users. It is advantageous, when the user does not wish to or is unable to make a choice, for the expert system itself automatically to determine the next respective test. A suitable selection strategy decisively shortens the duration of the diagnosis.

An advantageous embodiment of the invention is that in which the expert system chooses the test which has the greatest cost-benefit ratio. Furthermore, for each test still under consideration, the expert system calculates a numerical value for the usefulness U(T) in the case of the causes that are still possible and for the cost C(T), and then puts U(T) and C(T) into the ratio. The test having the greatest ratio is chosen.

The usefulness of a test T is calculated as an information gain to be expected according to a process which is known from information theory. Let QC be the quantity of causes still possible before carrying out T. Let Resu-1, . . . , Resu-n be the possible results of T; and for i=1, . . . , n let QC-i be the quantity of causes which are still possible when the result Resu-i is produced. Then $U(T)=q-1*IG-1+\ldots+q-n*IG-n$, wherein for i=1, . . . , n q-i is the conditional probability that T has the result Resu-i, if all causes in QC and no other causes are still possible and $IG-i=-Id[P(QC-i)/P(QC)]$ is the information gain by means of the result Resu-i.

In order to determine U(T) for a test T, a characterization of the occurrence frequency of each single cause is required, in order to calculate from it the occurrence probability of each cause still possible. In order to determine C(T), a characterization is required of the costs which are incurred by carrying out T.

In order to achieve a systematic breakdown of the information about unit types and to reduce the number of entries, similar unit types are combined into classes. In the classes, all common information is noted while in the unit type itself the individual information including the affiliation with classes is recorded. The information as to which classes unit type One possesses belongs to the knowledge module for One. This kind of process is known as a taxonomic organization of the diagnostic information, because a taxonomy (kinship hierarchy) is set up among the unit types. This taxonomy forms a directional graph that has a root, whose nodes stand for unit type and whose edges stand for the relationship "is from class". The root stands for "unit type"; the leaves stand for unit types actually used.

The basic procedure consists of recursively "gathering up" a necessary piece of information from the information about U-type as well as about the classes of U-type.

As an example, the information is sought as to which roles in U-type must be filled so that U-type can fulfill its standard function. To that end, in the knowledge module for U-type itself, it is determined which roles in U-type are stored there for the moment and these roles are buffer-stored. Then it is determined which classes U-type possesses. For each class U-type-c1, it is determined in the knowledge module for U-type-c1 which roles in U-type-c1 are stored there and the buffer memory for roles is added to. This process is carried out for the classes of U-type-c1; it ends when the root of the taxonomy tree is reached.

The advantageous embodiment of the invention, to which claim 14 pertains, solves the problem of how to guarantee at diagnosis time that the expert system has access to the memory Conf for the actual configuration of the technical system to be diagnosed and that this memory agrees with the actual configuration. This problem occurs, for example, if the expert system is used in a car repair shop.

The advantageous embodiment of the invention provides that the memory Conf is contained in the technical system itself, which is to be diagnosed. When an exemplar of a technical system is furnished, the memory Conf is filled with the information about its configuration, which information is structured according to the invention. Whenever a module of the exemplar is replaced by one of a different kind, the contents of the memory Conf are updated.

A further demand is met by the advantageous embodiment of the invention: It must be guaranteed that at the time of diagnosis, the expert system has reading access to each knowledge module for a unit type, which is used in the technical system to be diagnosed. For example, in the case of the expert system in the car repair shop, if all knowledge modules are stored in the shop. itself, logistical problems (in the "furnishing" of the knowledge modules) and storage space problems can arise, particularly if technical changes in unit types frequently force new versions of knowledge modules to be provided. However, if each knowledge module is centrally stored only once, then a large amount of data must be made available quickly to the expert system at the time of diagnosis.

The advantageous embodiment of the invention provides that all required knowledge modules are stored in the technical system itself. A process for realizing this concept is that in which the knowledge module for the type of One is stored in each unit One. If a unit is replaced by another, one must only guarantee that the new unit also contains "its" knowledge module, in order to guarantee that all knowledge modules are available to the expert system, even after the exchange. Storage space is saved if data which demands a lot of memory, such as text, is stored encoded in the technical system. Then it must be guaranteed that the expert system has the information at its disposal required to decode the code, for instance by the expert system having reading access to a table, by means of which text elements and code that belongs to them are linked.

For example in computer-assisted diagnosis in the car repair shop, an expert system must be able to diagnose all or at least many variants of a technical system. It can take a considerable amount of time, and logistical and storage space problems can arise, for example, in the case of the expert system in the car repair shop, if the knowledge base for each variant to be diagnosed is centrally stored at first and is furnished to all places of use; large amounts of data can be transmitted quickly, if each knowledge base is only contained centrally and if in the event of a diagnosis, the expert system need only have reading access to the centrally stored knowledge base.

Whenever an expert system must be in a position to diagnose several variants, it is therefore advantageous that the knowledge base for the actual variant to be diagnosed is not generated until the time of diagnosis. In order to avoid time-consuming data transmissions, the same software and hardware system first configures the knowledge base in a manner suitable for the variant and then carries out the diagnosis with this knowledge base.

The process according to the invention requires a memory Conf, which contains the following information about the variant TS of the technical system, for which a knowledge base should be built:

which units there are in TS, to which type TS belongs, for each unit One in TS, of which type One belongs, and for each SYS, wherein SYS is TS itself or a system in TS, and for each role in SYS, the designation of which unit in SYS fills this role.

It is possible in principle to generate this information "by hand". But it is characteristic for the variant TS and cannot be reused for other variants. Moreover, similarities between different subsystems of the same type in the variant cannot be systematically taken advantage of. It is therefore advantageous if the contents of Conf are automatically generated from information which is associated with the unit types and not with the unit exemplars.

The following material describes which configuration information is associated with each unit type and additionally with its knowledge module and how the description according to the invention of the actual configuration of the technical system TS, for which a knowledge base should be built, is automatically generated from this configuration information.

Let S-type be a system type, which occurs in TS; S-type is either the type to which the technical system itself belongs, or a type of a subsystem used in TS. The following information is associated with S-type:

(1) For each role Ro in S-type, it is determined to which unit type One the casting of Ro belongs. Two kinds of determinations are distinguished:

Either Ro is associated with a single, unconditional determination in S-type, namely the one that in each exemplar of the S-type, the role Ro is filled by a unit of the One type, or several conditional determinations are associated with Ro in S-type. One conditional determination names a unit type One, and as a condition, names a role Ro-1 in an S1-type system type. The determination means that in an exemplar Sys-Ex of the S-type, if Sys-Ex fills the role Ro-1 in a system of the S1-type, then the role Ro is filled by a unit of type One.

(2) For a role Ro in S-type, it can be determined which other roles a casting of Ro likewise plays in an exemplar of the S-type. The electric motor of a streetcar is an example of a unit which fills the role of "drive" as well as the role of "induction brake" in the technical system "streetcar". Here, also, two kinds of determination are distinguished:

An unconditional determination names only one other role Ro-i in S-type. This determination means that in each exemplar of the S-type, the unit that fills the role Ro at the same time also fills Ro-1.

A conditional determination names another role Ro-1 in S-type and as a condition, a role Ro-2 in another S2-type system. The determination means that in an exemplar Sys-Ex of the S-type, the casting of Ro then simultaneously fills Ro-1 if Sys-Ex fills the role Ro-2 in a system of the S2-type.

(3) For a role Ro in S-type, it can be determined which roles in other systems are also filled by the component that plays Ro in an exemplar of the S-type. Two kinds of determinations are distinguished:

An unconditional determination names one role Ro-1 exclusively in another S1-type system. This determination means that the unit One, which fills the role Ro in each exemplar of the S-type, at the same time also fills the role Ro-1 in each exemplar of the S1-type. The determination may only be reached if there is only one single unit One of this kind.

A conditional determination names a role Ro-1 in another S1-type system type and names either only one condition for S-type comprising a role Ro-2 in an S2-type system, which differs from S-type (condition for type I)

or only one condition for S1-type comprising a role Ro-2 in an S2-type system, which differs from S1-type (condition for type II)

or one condition each for S-type and S1-type, wherein the first condition comprises a role Ro-2 in an S2-type system, which differs from S-type and the second condition comprises a role Ro-3 in an S3-type system, which differs from S1-type (condition for type III).

This conditional determination means that the unit One, which fills the role Ro in an exemplar Sys-Ex of the S-type, additionally fills the role Ro-1 in an exemplar Sys-1-Ex of the S1-type whenever Sys-Ex fills the role Ro-2 in an exemplar of the S2-type or Sys-1-Ex fills the role Ro-2 in an exemplar of the S2-type or Sys-Ex fills the role Ro-2 in an exemplar of the S2-type and Sys-1-Ex fills the role Ro-2 in an exemplar of the S2-type as well.

The configuration information is in fact associated with unit types—just like the knowledge module structured according to the invention. However, the configuration information about an S-type system type—as opposed to that in the knowledge module for S-type—depends upon the use of an exemplar Sys-Ex of the S-type and upon the version of the subunits in Sys-Ex. That is why this information is suitably held in an individual memory Conf-info.

The description, laid out according to the invention, of the actual configuration of a technical system TS is generated by a computer Conf-C and stored in a memory Conf. Conf-C has reading access to the memory KM, which has the knowledge modules and is structured according to the invention, reading access to the memory Conf-info, which is structured according to the advantageous embodiment, writing access to the memory Conf, which after the work of Conf-C contains the actual configuration, and read/write access to the working memory WM.

If the computer Conf-C is to be able to function, a process must be developed and employed by Conf-C in order to automatically generate a unique identification for each unit One in the technical system. This identification suitably depends upon the type to which One belongs, and—aside from when One is the technical system itself—upon the identification of a system Sys-Ex, in which One fills a role, and upon the identification of this role.

Figure 12:
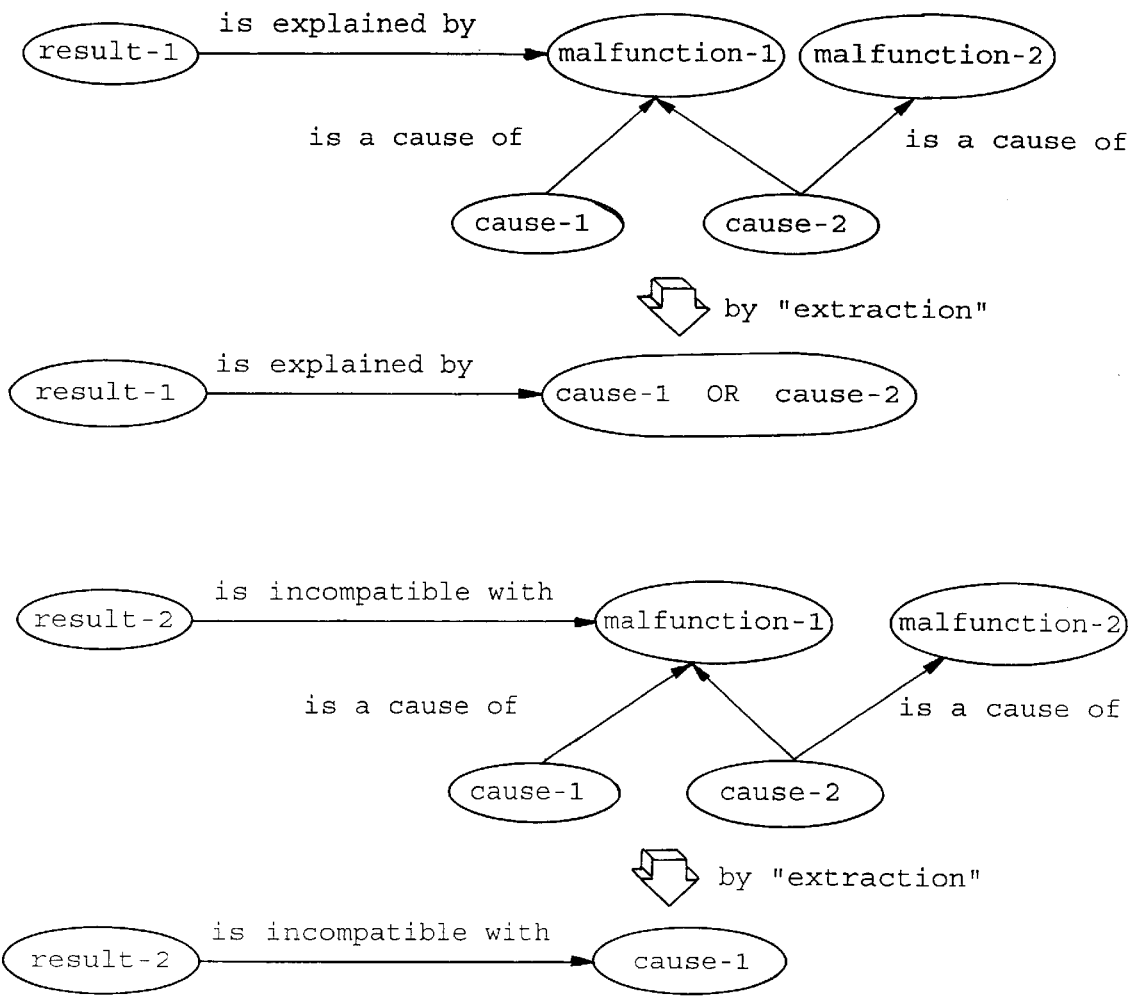
FIG. 12 demonstrates how the interrelationships between results and causes, which are required for a diagnosis according to the process shown in FIG. 6, are obtained.
Figure 13:
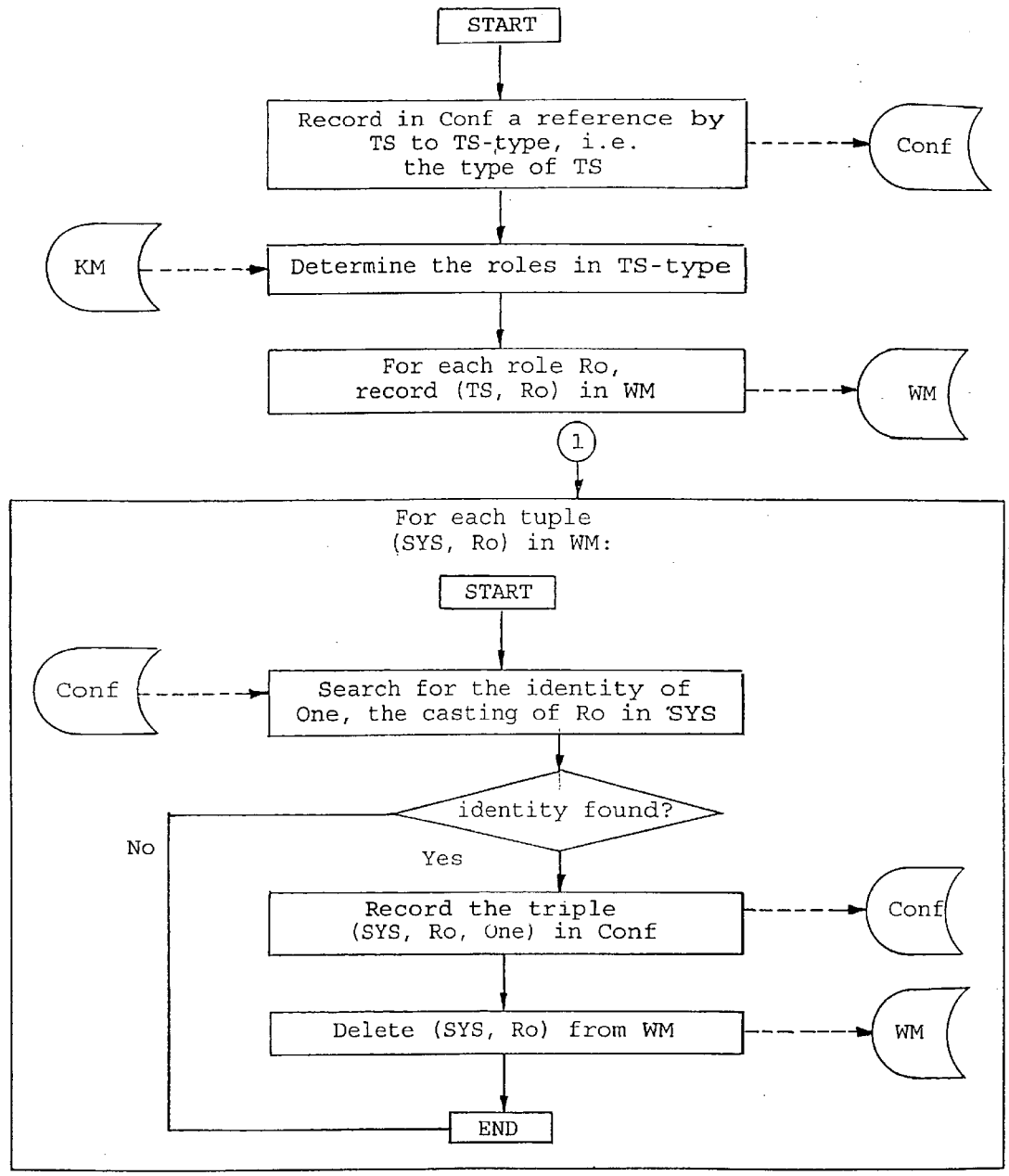
FIG. 13 shows how the information about the actual configuration of a technical system is obtained automatically from information associated with the unit-types.
Figure 13:
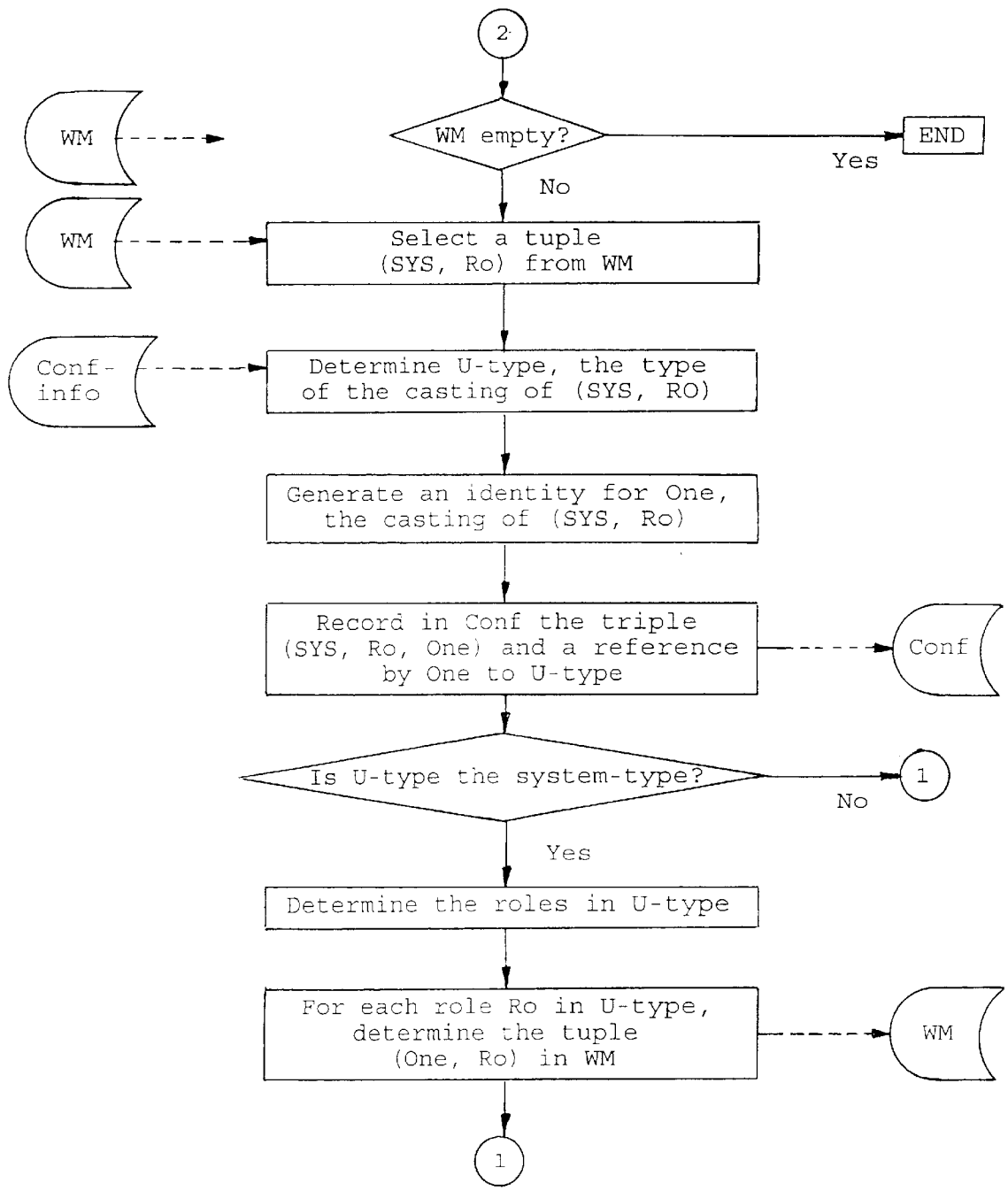

FIG. 12 explains the process of Conf-C for a technical system TS:

Each entry in the working memory WM is a tuple comprising an identification for TS or of a subsystem SYS of TS as well as of an identification for a role in TS or SYS. For each pair indicated by a tuple in WM, the casting is still to be determined. The entries in Conf are generated by Conf-C; each entry is a triple, comprising an identification for TS or of a subsystem SYS of TS, an identification for a role Ro in TS or SYS, and an identification for the unit One, which fills Ro in TS or SYS.

Conf-C determines to which type TS-type TS belongs, and stores this information in Conf.

Conf-C determines by reading access to KM which roles exist in TS-type.

For each role Ro of that kind, Conf-C records a tuple in WM, comprising the identification for TS and that for Ro.

Conf-C runs through the following loop until WM is empty:

In WM, Conf-C determines each tuple, which indicates a system SYS and a role Ro in SYS, for whose casting One the identification has already been generated. That the identification for One has already been generated is possible if One fills another role at the same time. The next step outlines how Conf-C determines these tuples.

For each tuple of this kind,
Conf-C writes a triple in Conf, which consists of the identification of SYS, Ro, and one.
Conf-C deletes the tuple in WM.

If WM still contains one or more tuples, Conf-C executes the following work steps:

Conf-C selects another tuple from WM. Let SYS be the system indicated by the tuple and let Ro be the role indicated in SYS.

Conf-C determines by reading access to Conf, what type SYS belongs to.

Conf-C determines by reading access to Confinfo which U-type the casting One of Ro in SYS belongs to.

Conf-C generates an identification for One, which identification depends upon U-type, Ro, and SYS.

Conf-C records in Conf a triple consisting of the identifications of SYS, Ro, and One.

Conf-C records in Conf that One is of the U-type, i.e. records in Conf a reference of the identification for One to the identification for U-type.

Conf-C deletes the tuple in WM.

Conf-C determines by reading access to KM whether U-type is a system type or a component type.

If U-type is a system type,
Conf-C determines all roles in U-type
and records for each role in U-type records an identify in WM, which identification consists of one identification for One and one identification for the role.

If WM is empty, then the actual configuration is completely stored in Conf according to the invention.

Conf-C determines by means of the steps (A) and (B) described below whether a tuple in the working memory WM indicates a system and a role, for whose casting an identification has already been generated: Let Sys-Ex be the system and let Ro be the role in the system of whose identifications the tuple is comprised.

(A) Conf-C determines the S-types of Sys-Ex and determines by reading access to the memory Conf-info which determinations of the (2) kind are stored in Conf-info for the role Ro in S-type.

For each determination, which links Ro-1 in S-type with another role Ro-1 in S-type, Conf-C searches for a triple in Conf, which consists of the identification for Sys-Ex, for Ro-1, and for a unit One. If the determination in Conf-info is a conditional one, Conf-C determines by reading access to Conf whether Sys-Ex fulfills the condition. If the condition is fulfilled or if the determination is an unconditional one, then One is the casting sought; the identification of One is in Conf.

If Conf-C finds several suitable units One, then the information stored in Conf-info is contradictory. Conf-C breaks off its work and reports the discovered contradiction.

(B) If Conf-C finds no suitable unit by means of step A, then Conf-C determines by reading access to the memory Conf-info which determinations of the (3) kind are stored in Conf-info for the role Ro in S-type.

For each determination, which links Ro in S-type with a role Ro-1 in another S1-type system, ConfC searches in Conf for all identifications for exemplars of S1-type. If there are identifications of this kind, let Sys-Ex-1, . . . , Sys-Ex-n be the exemplars of the S1-type named by the identifications.

For each Sys-Ex-i (i=1, . . . , n), Conf-C searches in Conf for a triple which consists of the identification for Sys-Ex-i, for Ro-1, and for a unit One. If the determination is a conditional one of the (type 1) kind, Conf-C tests by reading access to Conf whether Sys-Ex fulfills the condition; if the determination is a conditional one of the (type II) kind, Conf-C tests whether Sys-Ex-i fulfills the condition; if the determination is a conditional one of the (type III) kind, Conf-C tests whether both Sys-Ex and Sys-Ex-i respectively fulfill the condition.

If Conf-C finds several suitable units One, then the information stored in Conf-info is contradictory. Conf-C breaks off its work and reports the discovered contradiction.

We claim:

1. A device for building the knowledge base of an expert system, which diagnoses a technical system comprised of modules, the device comprising:

computer (Kb-builder) having reading access to a first memory (KM) and to a second memory (Conf) as well as having at least intermittent writing access to a third memory (Kb), and information about the technical system, about its malfunctions and about its diagnosis, the information being stored in the first memory (KM), the information comprising:

for the type to which the technical system belongs, a knowledge module, which contains all necessary information about the internal design of a technical system of this type as well as information, when needed, about the malfunctions, remedies, and tests in a technical system of this type, and for each type of module, which occurs at least once in the technical system, a respective knowledge module, which contains all necessary information about the internal design of a module of this type as well as information, when needed, about the malfunctions, remedies, tests, and results in a module of this type, wherein in the knowledge module for the type to which the technical system belongs, information is contained as to which roles, that is, which subfunctions must be filled by an assignment of a module, that is, which subfunctions must received an assignment of a module, so that the technical system can fulfill its standard function, wherein for each type of composite modules that occur in a technical system of the type, information is contained in the knowledge module for this module type as to which roles must be filled in a module of this module type so that the module can fulfill its standard function, wherein for each role in the technical system and each role in each composite module in the technical system, information is available as to which module fills the role in the technical system or in the composite module, wherein the configuration of the technical system is stored in the second memory (Conf), and wherein in the third memory (Kb), a knowledge module for the technical system is created as a copy of the knowledge module for the type to which the technical system belongs, for each module in the technical system, a separate knowledge module is contained as a copy of the knowledge module for the type to which the module belongs, and wherein each thus-formed knowledge module for a module corresponding to the role that the module plays in the composite module in the technical system is combined with the thus-formed knowledge module for the composite module or for the technical system.

2. The device according to claim 1, wherein in the second memory (Conf), information is stored as to:

what type the technical system belongs to, for the technical system and for each composite module in the technical system, what types the modules which fill the roles in the technical system or the module, respectively, belong to, and which modules fill several roles at the same time.

3. The device according to claim 1, wherein a remedy is stored in the first memory (KM) for each malfunction that occurs in a technical system of the type to which the technical system belongs and that is effected directly from the outside, wherein in the first memory (KM), for the type of technical system to which the technical system belongs as well as for each type of module which occurs at least once in the technical system, the following are stored:

a remedy in the technical system or module, for each malfunction in a technical system or in a module of the type that is neither the result of another malfunction of the technical system or of the module nor the result of a role in the technical system or module, nor of another malfunction that is effected directly from the outside, which tests in a technical system or a module of the type can be carried out in the course of a diagnosis, for each test in a technical system or a module of the type, its standard result, that is, which result the test has if the technical system is not malfunctioning, for each test in a technical system or a module of the type, all of its non-standard results, that is, which results the test can have besides its standard result, for each non-standard result of a test in a technical system or a module of the type, which malfunctions the technical system or module, respectively, explain the non-standard result, for each result of a test in a technical system or a module of the type, which malfunctions in the technical system or module the result is incompatible with.

4. The device according to claim 1, wherein for the type of technical system to which the technical system belongs, as well as for each type of module which occurs in the technical system, a unique identification of the type is stored in the first memory (KM), and wherein stored in the second memory (Conf) are:

a unique identification for the technical system and for each module in the technical system and for each role in the technical system and for each role in each composite module in the technical system, which identification the module has that fills the role.

5. The device according to claim 1, further comprising a first computer (Conf-C), wherein the first computer (Conf-C) generates a unique identification for the technical system and for each module in the technical system, and then, if a module is composite, the first computer (Conf-C) determines, for each role in this module, the identification of the casting of this role.

6. The device according to claim 1, wherein the computer (Kb-builder) has at least intermittent writing access to a fourth memory (Kb-int), wherein the device further comprises a second computer (Kb-extractor) having at least intermittent reading access to the fourth memory (Kb-int) and having at least intermittent writing access to the third memory (Kb), wherein in a first phase, the computer (Kb-builder) builds a knowledge base for the technical system and stores the knowledge base in the fourth memory (Kb-int), wherein in a second phase, the second computer (Kb-extractor):

determines which single causes can occur in the technical system and its modules, for each of these causes, determines which remedy will remove the cause, determines which tests can be carried out in the technical system and its modules in the course of a diagnosis, for each of these tests, determines which standard result and which non-standard results the test has, for each result, determines with which causes it is incompatible, for each non-standard result, additionally determines which causes explain it, and stores all of this information in the third memory (Kb).

7. The device according to claim 1, wherein the information in the first memory (KM) is organized taxonomically such that it is possible that in the first memory (KM), in the description for a module type, for it to be stored which other module type the information about the module type is to be taken from, if this information is missing from the description of the module type.

8. The device according to claim 1, further comprising a first computer (Conf-C) having reading access to the first memory (KM) and to a fourth memory (Conf-info) and having at least intermittent writing access to the second memory (Conf)

wherein in the fourth memory (Conf-info), for the type of technical system to which the technical system belongs, as well as for each type of module which occurs at least once in the technical system, for each role in a technical system or a module of this type what module type the casting of this role belongs to is stored, what other roles in the technical system or in the module a casting of this role additionally fills can be stored, wherein this determination may be linked to a condition, and what roles in other composite modules a casting of this role additionally fills can be stored, wherein this determination can be tied to a condition, and wherein in a first phase, the first computer (Conf-C), after reading access to the fourth memory (Conf-info), determines the configuration of the technical system and stores it in the second memory (Conf), and then the computer (Kb-builder) generates a knowledge base for the technical system and stores it in the third memory (Kb).

9. The device according to claim 8, wherein the first memory (KM) is either totally or partially contained in the technical system to be diagnosed; and not until when the technical system should be diagnosed does the computer (Kb-builder) gain reading access to the second memory (Conf), by means of on-line access or by data carrier, and automatically generate a knowledge base.

10. The device according to claim 1, wherein at least one of the first computer (Conf-C) and the computer (Kb-builder) is identical to the third computer (Diag).

11. The device according to claim 1, wherein at least one of the first computer (Conf-C), the computer (Kb-builder) and the third computer (Diag) is contained in the technical system to be diagnosed.

12. The device according to claim 8, further comprising:

a third computer (Diag) having at least intermittent reading access to the third memory (Kb), wherein in a second phase, the third computer (Diag) diagnoses the technical system.

13. The device according to claim 1, further comprising:

a third computer (Diag) having at least intermittent reading access to the third memory (Kb), wherein in a first phase, the computer (Kb-builder) automatically generates a knowledge base for the technical system and stores it in the third memory (Kb), and in a second phase, the third computer (Diag) diagnoses the technical system.

14. The device according to claim 13, wherein the second memory (Conf) is contained in the technical system to be diagnosed; and not until when the technical system should be diagnosed does the computer (Kb-builder) gain reading access to the second memory (Conf), by means of on-line access or by data carrier, and automatically generate the knowledge base.

15. The device according to claim 13, wherein the third computer (Diag) has read/write access to a working memory (WM), wherein in the second phase, the third computer (Diag) diagnoses the technical system by:

determining by reading access to the third memory (Kb), which causes can occur in the technical system, and recording these causes in the working memory (WM), then, as long as the working memory (WM) still contains more causes, executes in a loop the sequence, which consists of the fact that the third computer (Diag):

carries out a test automatically or causes it to be carried out by a person, then determines which result the test has, then deletes from the working memory (WM) all causes which are incompatible with the result, then, if the result is a non-standard result of the test, deletes from the working memory (WM) all causes which are incompatible with the result, and adds to the working memory (WM) all the multiple causes that consist of a cause which explains the result, and of a cause which the third computer (Diag) has just deleted from the working memory (WM), then, if there is still a single cause left in the working memory (WM), marks this cause as having really occurred and carries out the assigned remedy, or then, if there are no causes left in the working memory (WM), marks the technical system as malfunction-free.

16. The device according to claim 1, wherein for each cause, which can occur in the technical system, a characterization of its occurrence frequency is stored in the first memory (KM), and for each test, which can be carried out in the technical system, a characterization of the cost of its being carried out is stored in the first memory (KM).

17. The device according to claim 1, further comprising a third computer (Diag), having at least intermittent reading access to the third memory (Kb), wherein the third computer (Diag), depending upon the characterizations of the occurrence frequencies of all causes and upon the costs of carrying out all tests, selects the test which has the most favorable ratio between the expected usefulness of discrimination among the causes that are still possible and the costs.

18. A device according to claim 1, wherein the computer (Kb-builder) automatically creates a complete malfunction graph for the technical system and stores it in the third memory (Kb).

19. The device according to claim 1, wherein for the type of technical system to which the technical system belongs as well as for each type of module which occurs in the technical system, a unique identification of the type is stored in the first memory (KM), wherein in the first memory (KM) for the type of technical system to which the technical system belongs as well as for each type of module which occurs at least once in the technical system, the following are stored in memory:

which malfunctions in a technical system or in each module of the type act directly toward the outside, which malfunctions in a technical system or in a module of the type are effected upon directly from the outside, which malfunctions in a technical system or in a module of the type act internally, which malfunctions in a technical system or in a module of the type result in which other malfunctions in the technical system or in the module, and in a module of the type, whether it is elementary or composite, wherein for the type of technical system to which the technical system belongs, as well as for each type of composite module, which occurs at least once in the technical system, in the first memory (KM), is stored which roles subfunctions in the technical system or in the module must be filled so that the technical system or the module can fulfill its standard function, and for each of these roles in the technical system or module, the following are stored in memory:

what malfunctions in the role act directly toward the outside, what malfunctions in the role are effected directly from the outside, for each malfunction Malf in the role that acts directly toward the outside, what other malfunctions in a technical system or in a module of the type and what malfunctions in other roles in this technical system or in this module are the results of the malfunction Malf, for each malfunction Malf in the role that is effected directly from the outside, what other malfunctions in a technical system or in a module of the type and what malfunctions in other roles in this technical system or in this module result in the malfunction Malf.

* * * * *